US011902178B2

(12) United States Patent
Chawla

(10) Patent No.: US 11,902,178 B2
(45) Date of Patent: Feb. 13, 2024

(54) SYSTEM AND METHOD TO EFFECTIVELY ALLOCATE COMPUTING RESOURCES TO END USERS

(71) Applicant: Citrix Systems, Inc., Fort Lauderdale, FL (US)

(72) Inventor: Prabhjeet Singh Chawla, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 105 days.

(21) Appl. No.: 17/545,609

(22) Filed: Dec. 8, 2021

(65) Prior Publication Data

US 2023/0179540 A1 Jun. 8, 2023

(51) Int. Cl.
*H04L 47/80* (2022.01)
*H04L 47/70* (2022.01)
*H04L 47/762* (2022.01)
*H04L 47/78* (2022.01)

(52) U.S. Cl.
CPC .......... *H04L 47/808* (2013.01); *H04L 47/762* (2013.01); *H04L 47/781* (2013.01); *H04L 47/822* (2013.01)

(58) Field of Classification Search
CPC ... H04L 47/808; H04L 47/762; H04L 47/781; H04L 47/822
See application file for complete search history.

(56) References Cited

U.S. PATENT DOCUMENTS

| 2014/0173597 | A1* | 6/2014 | Anand | G06F 9/5038 718/1 |
| 2015/0212857 | A1* | 7/2015 | Beveridge | G06F 9/542 718/1 |
| 2019/0146840 | A1* | 5/2019 | Helms | G06F 9/5011 718/104 |
| 2020/0358714 | A1* | 11/2020 | Singleton, IV | H04L 67/141 |

* cited by examiner

*Primary Examiner* — Farzana B Huq

(57) ABSTRACT

Effectively allocating computing resources to end-users is provided. A system can identify mapping groups comprising a first mapping group that maps first users to corresponding first machines having a first hardware configuration, and a second mapping group that maps second users to corresponding second machines having a second hardware configuration. The system can determine a first metric indicating computing resource utilization of a first machine of the first machines when executing one or more sessions of a first user in the first mapping group, and a second metric indicating computing capacity of the second machines. The system can re-map the first user from the first mapping group to the second mapping group to cause sessions of the first user to execute on a second machine of the second machines.

15 Claims, 10 Drawing Sheets

SYSTEM AND METHOD TO EFFECTIVELY ALLOCATE COMPUTING RESOURCES TO END USERS

FIELD OF THE DISCLOSURE

This application generally relates to effectively allocating computing resources to end-users.

BACKGROUND

Client devices can communicate with servers via established communication channels. The user of the client device can be assigned a machine of a group of machines. The client device can establish a session with the assigned machine. The client device can access applications and resources via the established session with the machine. The client device can consume resources on the machine subsequent to establishing the session with the machine.

SUMMARY

In a virtualized environment, a host system (e.g., a server or a machine, such as a single or multi-session machine) can host one or more sessions for individual users. Individual users can be assigned to a respective machine having certain hardware configurations (e.g., processing resources, memory resources, network bandwidth, etc.). The machine can be assigned to the user based on at least the type of user (e.g., account type or privilege), access location, types of resources requested, an entity associated with the user, etc. However, due to different hardware configurations on various machines (e.g., physical or virtual machines), it can be challenging to efficiently assign users to a machine without wasting resource capacity or insufficient resources. For instance, high computing power machines assigned to users with low utilization can waste the available resource capacity, and low computing power machines assigned to users with high utilization can impact the user experiences (UXs) due to lack of resources. Hence, the initial assignment of users to respective machines can be erroneous, introduce wasted resources, or decrease UX for the users impacted by low resource capacity.

The systems and methods of this technical solution can collect or obtain data associated with configurations of the machines and historical data of the users from various sources (e.g., a performance analytics system), such as virtual application and desktop (VAD) service, workspace service, among other sources, data repositories, or services. The systems and methods can include a computing device including one or more processors to process the data to generate or determine one or more metrics regarding infrastructure analytics, machine analysis, or other details of the computing environment. For example, based on the data from one or more sources, the computing device can determine at least the downtime, latency, failures (e.g., login failures, process failures, session failures, etc.), status of machines or virtual desktop infrastructure (VDI), central processing unit (CPU) consumption, or memory (e.g., random access memory (RAM)) consumption over time.

The machines can be associated with different delivery groups or mapping groups based on the configuration (e.g., hardware configuration, resource capacity, or performance) of the machines. The computing device can leverage the obtained data to identify or select one or more machines that are underutilized or over utilized. Based on the configuration of the machine or activities by the user, the computing device can re-assign, re-map, shift, or otherwise move the user to a different delivery group having less computing power or more computing power. Therefore, the computing device can effectively allocate computing resources to users based on persistent individual workloads or resource consumption standpoints (e.g., low, medium, or high usage). Thus, the systems and methods described herein can at least improve resource allocation to individual users, improve UX of one or more sessions, reduce wasted resources, and optimize resource utilization or resource capacity. Further, instead of upgrading hardware components of the machines, the systems and methods can move the users from low-capacity machines to available higher-performance machines.

In one aspect, this disclosure is directed to a method for effectively allocating computing resources to end-users. The method can include identifying, by one or more processors, a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users. The method can include determining, by the one or more processors, a first metric indicating computing resource utilization of a first machine of the first plurality of machines when executing one or more sessions of a first user in the first mapping group, and a second metric indicating computing capacity of the second plurality of machines. The method can include re-mapping, by the one or more processors based at least in part on the first metric for the first machine and the second metric, the first user from the first mapping group to the second mapping group to cause sessions of the first user to execute on a second machine of the second plurality of machines with the second hardware configuration different from the first hardware configuration.

The method can include re-mapping the first user based on a first comparison of the first metric with a first threshold established for the first mapping group and a second comparison of the second metric with a second threshold established for the second mapping group. In some cases, the first threshold can indicate a minimum computing resource utilization or a maximum computing resource utilization for the first plurality of machines. The second threshold can indicate a minimum computing capacity or a maximum computing capacity of the second plurality of machines. In some cases, the first threshold can indicate a minimum computing resource utilization or a maximum computing resource utilization for the first plurality of machines. The second threshold can indicate a minimum computing capacity or a maximum computing capacity of the second plurality of machines.

The first metric can indicate low computing resource utilization of the first machine The method can include re-mapping, by the one or more processors based at least in part on the first metric indicating the low computing resource utilization and the second metric, the first user from the first mapping group to the second mapping group. In some cases, the method can include re-mapping, by the one or more processors based at least in part on the first metric indicating computing resource utilization higher than a threshold of the first machine, the first user from the first mapping group to a third mapping group of the plurality of mapping groups, the third mapping group mapping a third plurality of users to a corresponding third plurality of machines having a third hardware configuration that hosts sessions for the third plurality of users. The third hardware configuration can be different from the first hardware configuration and the second hardware configuration.

The plurality of mapping groups can be organized in a hierarchy based on computing capacity of a plurality of machines in each of the plurality of mapping groups. The computing capacity of the second plurality of machines can be based on the second hardware configuration. The computing capacity of the second plurality of machines can be based on computing resource utilization of the second plurality of machines.

The method can include transferring, by the one or more processors, a profile of the first machine established for the first user to the second machine of the second plurality of machines to establish the second machine for the first user. In some cases, the method can include determining, by the one or more processors, a third metric indicating computing resource utilization of the second machine established for a second user. The method can include swapping, by the one or more processors based on at least in part on the first metric for the first machine and the third metric for the second machine, a first profile of the first user from the first machine and a second profile of the second user from the second machine to cause the sessions of the first user to execute on the second machine and sessions of the second user to execute on the first machine.

In another aspect, this disclosure is directed to a system for effectively allocating computing resources to end-users. The system can include one or more processors, coupled to memory. The one or more processors can be configured to execute identify a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users. The one or more processors can determine a first metric indicating computing resource utilization of a first machine of the first plurality of machines when executing one or more sessions of a first user in the first mapping group, and a second metric indicating computing capacity of the second plurality of machines. The one or more processors can re-map, based at least in part on the first metric for the first machine and the second metric, the first user from the first mapping group to the second mapping group to cause sessions of the first user to execute on a second machine of the second plurality of machines with the second hardware configuration different from the first hardware configuration.

The one or more processors can re-map the first user based on a first comparison of the first metric with a first threshold established for the first mapping group and a second comparison of the second metric with a second threshold established for the second mapping group. The first threshold can indicate a minimum computing resource utilization or a maximum computing resource utilization for the first plurality of machines. The second threshold can indicate a minimum computing capacity or a maximum computing capacity of the second plurality of machines.

The first metric can indicate low computing resource utilization of the first machine. The one or more processors can re-map, based at least in part on the first metric indicating the low computing resource utilization and the second metric, the first user from the first mapping group to the second mapping group. In some cases, the one or more processors can re-map, based at least in part on the first metric indicating computing resource utilization higher than a threshold of the first machine, the first user from the first mapping group to a third mapping group of the plurality of mapping groups, the third mapping group mapping a third plurality of users to a corresponding third plurality of machines having a third hardware configuration that hosts sessions for the third plurality of users. The third hardware configuration can be different from the first hardware configuration and the second hardware configuration.

The plurality of mapping groups can be organized in a hierarchy based on computing capacity of a plurality of machines in each of the plurality of mapping groups. The computing capacity of the second plurality of machines can be based on the second hardware configuration. The computing capacity of the second plurality of machines can be based on computing resource utilization of the second plurality of machines.

These and other aspects and implementations are discussed in detail below. The foregoing information and the following detailed description include illustrative examples of various aspects and implementations, and provide an overview or framework for understanding the nature and character of the claimed aspects and implementations. This Summary is not intended to identify key features or essential features, nor is it intended to limit the scope of the claims included herewith. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
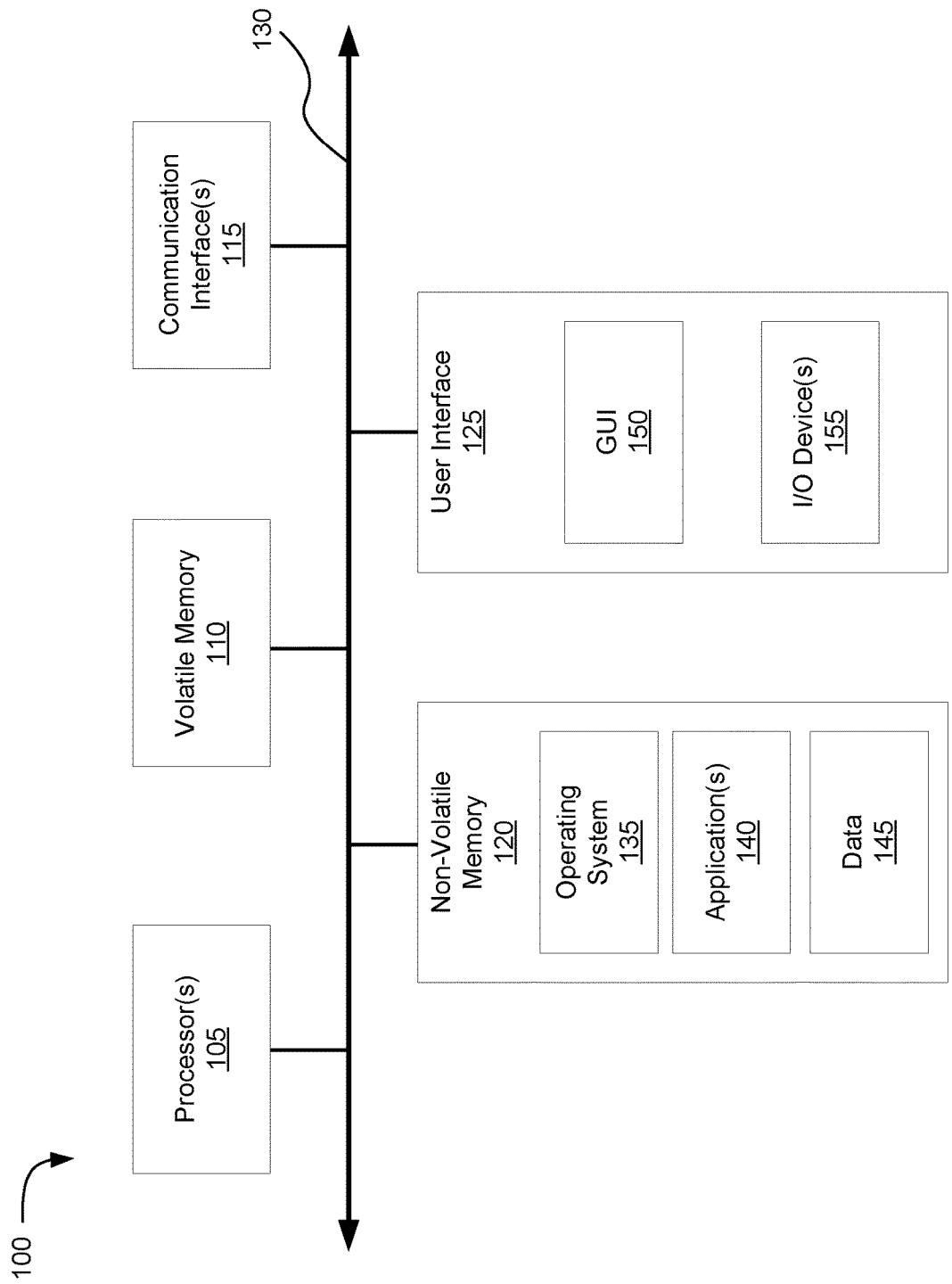
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for effectively allocating computing resources to end-users.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
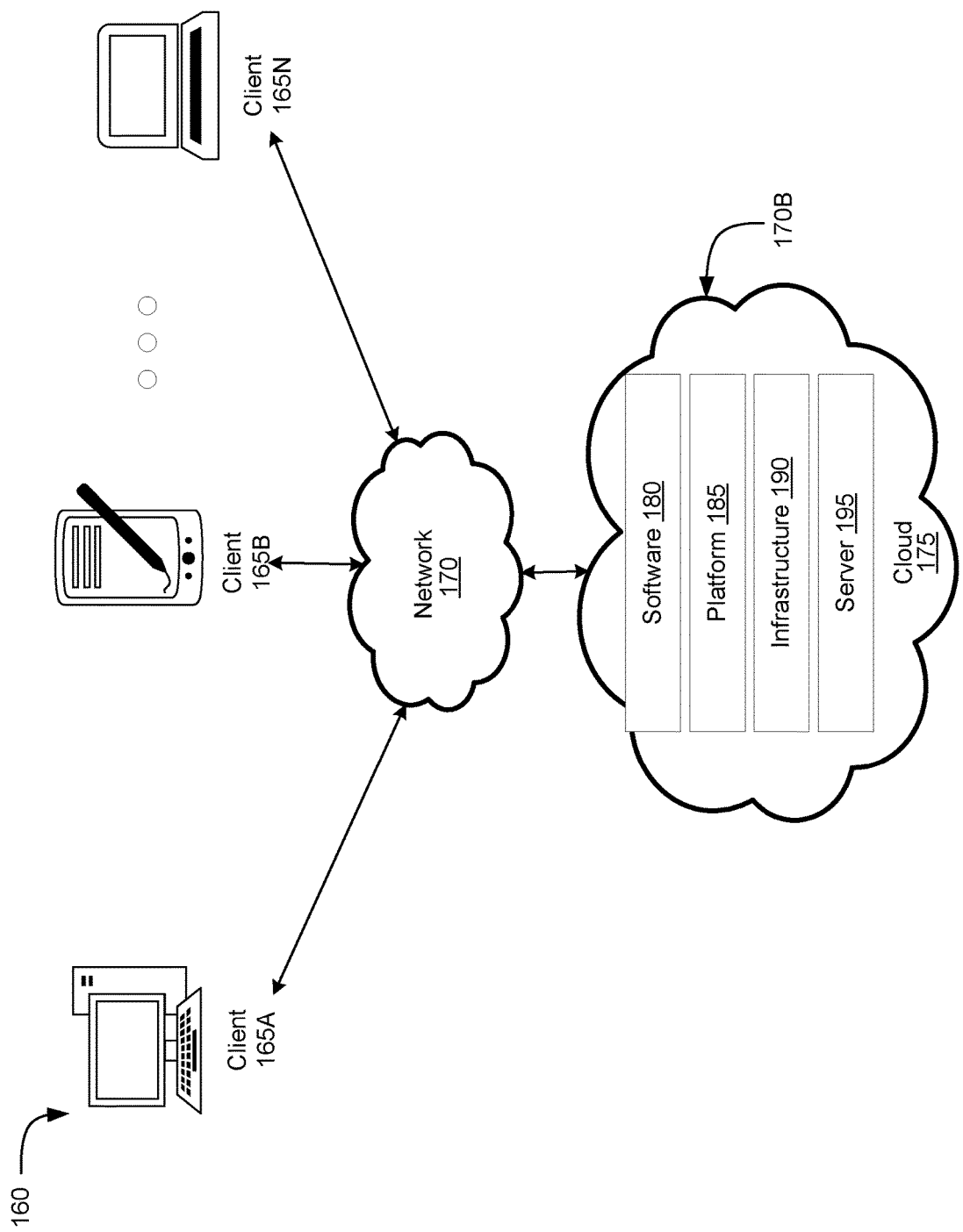
FIG. 1B is a block diagram depicting a computing environment comprising client device in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
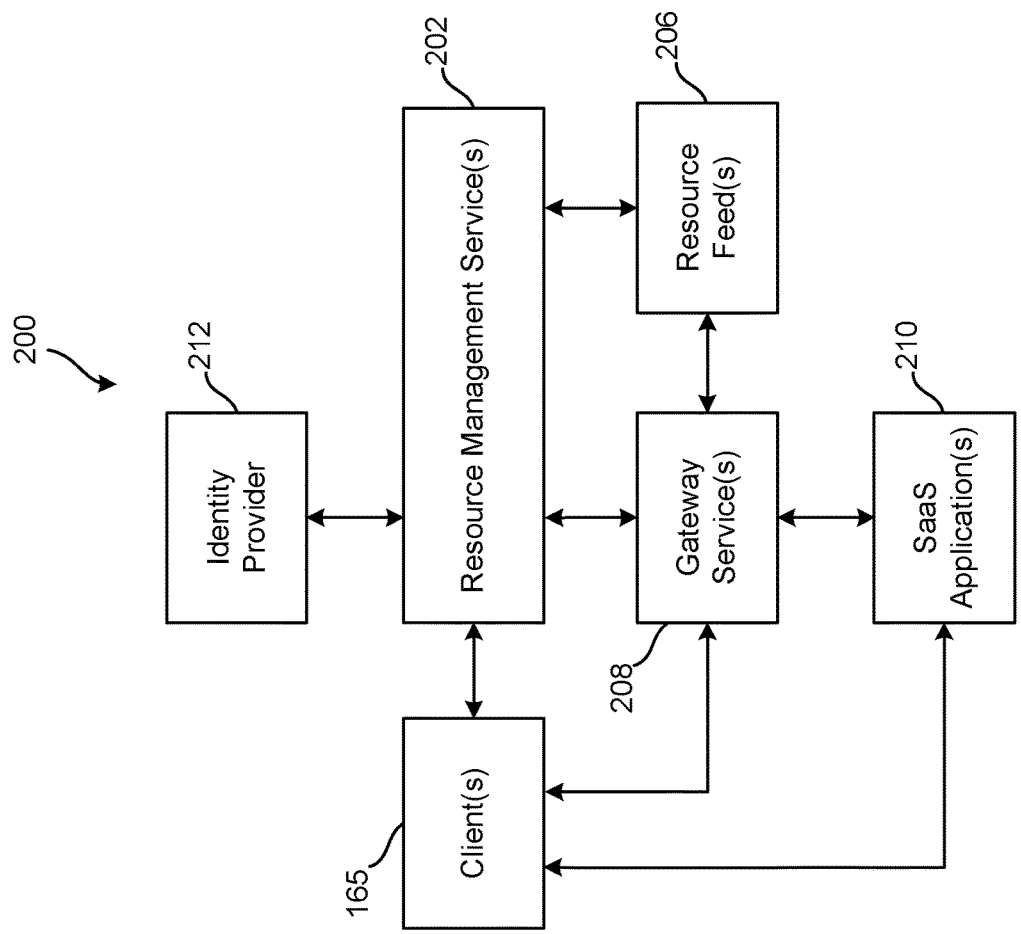
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
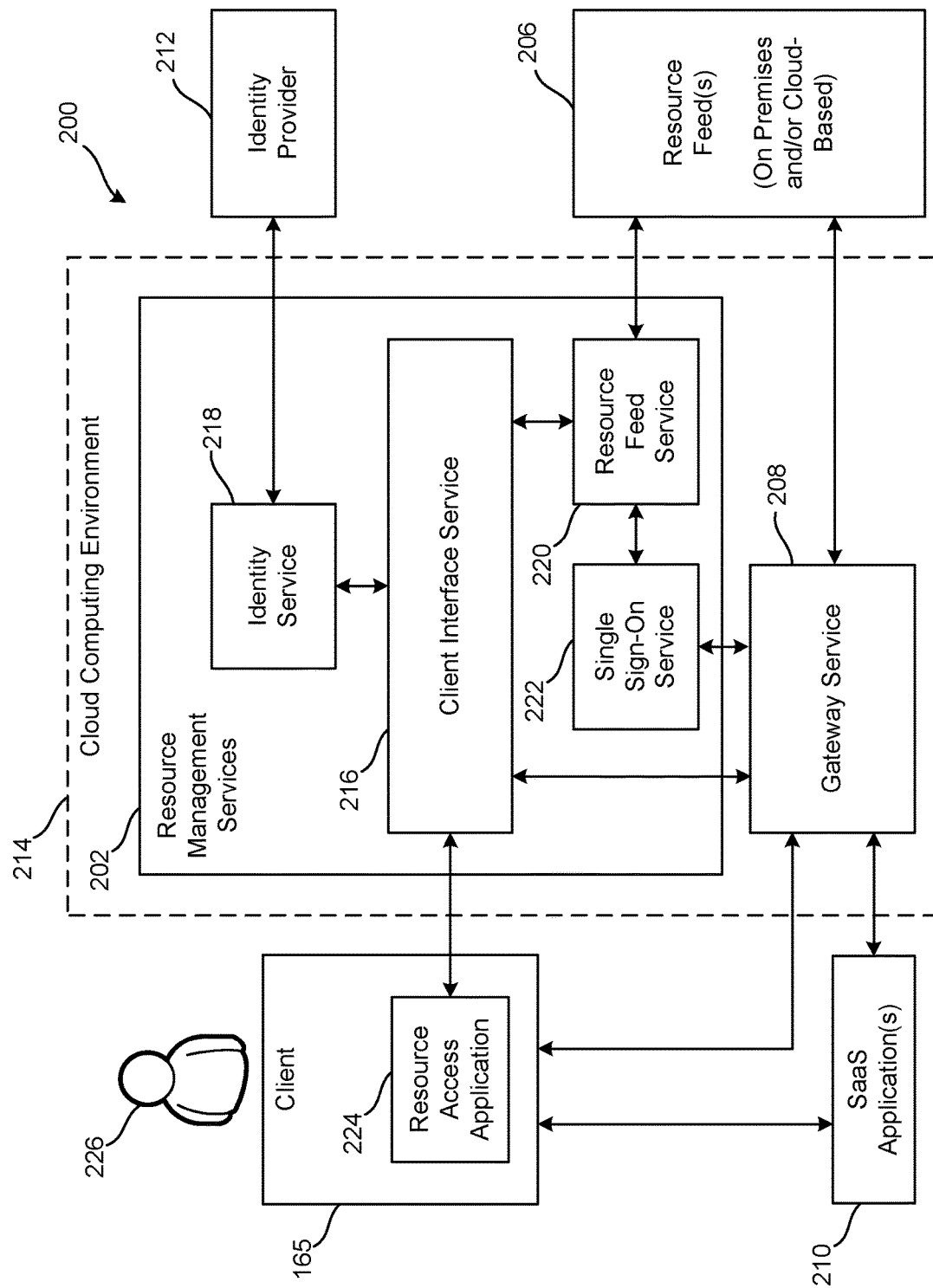
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of the illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well as a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (4) restricting navigation, e.g., by disabling the next and/or back browser buttons, (5) restricting downloads, e.g., by disabling the ability to download from within the SaaS application, and (6) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface—without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
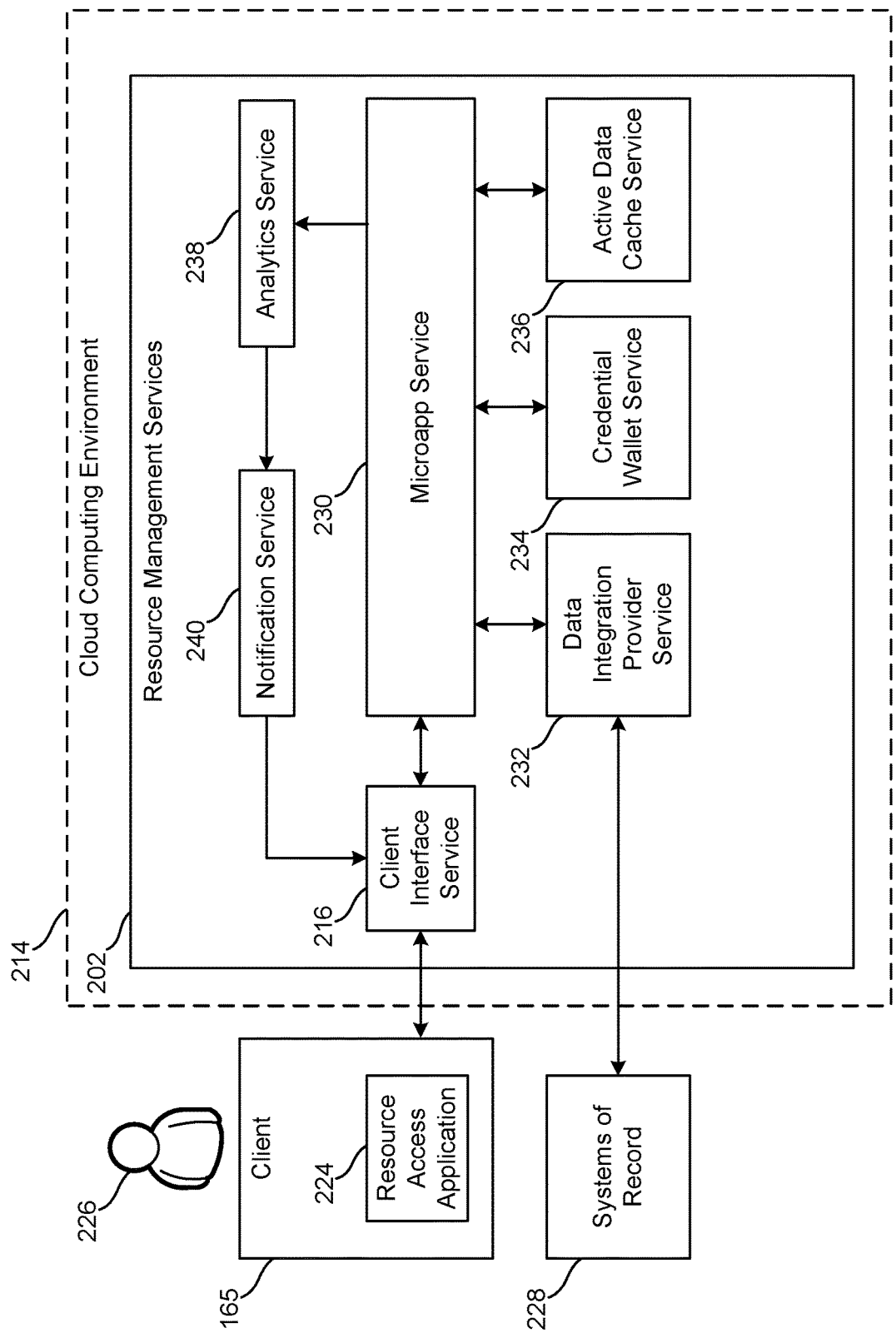
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back end. In some embodiments, users may be able to interact with the virtual assistance through either the resource access application 224 or directly from another resource, such as Microsoft Teams. This feature may allow employees to work efficiently, stay organized, and delivered the specific information they are looking for.

C. Systems and Methods for Effectively Allocating Computing Resources to End-Users A client device can access resources on a cloud service, server, or remote device by establishing a session with a machine (e.g., virtual or physical machine). The client device can be assigned to the machine based on the type of user (e.g., account type), availability of machines, subscription of the user, or entity (e.g., company, corporate, etc.) associated with the user. Based on the activities of the user on the assigned machine, the machine may be over-utilized (e.g., overloaded) or under-utilized. The over-utilization or under-utilization can cause poor UX or wasted resources, respectively.

The systems and methods of this technical solution can re-map or re-assign users to a different machine of a different mapping group (sometimes referred to as a delivery group) based on data of the machine (e.g., configuration, resource capacity, resource consumption, latency, failures, etc.) of the machine and the historical data (e.g., aggregated resource utilization over time) of the user. For example, the systems and methods can obtain data (e.g., resource metric) from a virtual desktop infrastructure (VDI) or other sources to determine configurations (e.g., resource capacity) of machines in different mapping groups and the resource consumption of individual machines.

The systems and methods can provide administrators an option to configure analysis intervals, thresholds (or policies) to upgrade or downgrade users, a listing of mapping groups for upgrading the user, a listing of mapping groups for downgrading the user, among other settings. In some cases, the systems and methods can dynamically determine certain configurations (e.g., one or more thresholds or listing of mapping groups). Upgrading the user can include or correspond to transferring the user (e.g., the user profile or user configuration) to another machine having higher performance (e.g., higher resource capacity, processing power, or memory) than the current machine. Downgrading the user can include or correspond to transferring the user to another machine having lower performance than the current machine.

The systems and methods can aggregate the resource consumption (or available resource capacity) for individual machines over time. The resource consumption or available resource capacity of the machines can reflect the activities or utilization by the associated users. The systems and methods can compare the resource consumption or resource capacity of the machines to the one or more thresholds to identify over-utilized or under-utilized machine(s). The systems and methods can generate or provide a list of machines to manage, such as providing the list to the administrator or storing the list for taking an action.

The systems and methods can provide at least one option or action to the administrator for machines in the list, such as to move one or more users to a higher computing mapping group (e.g., mapping group with higher performance machines) or lower computing mapping group (mapping group with lower performance machines). For instance, the action may include using a service (e.g., broker service) including a set of application programming interfaces (APIs) via certain calls or scripts (e.g., PowerShell or representational state transfer (REST) calls). Upon initiating the action, the systems and methods can move the user to a machine of a different mapping group. In some cases, the systems and methods may initiate an automatic action based on inputs from the administrator. Accordingly, the systems and methods described herein can at least improve resource allocation to individual users, improve UX of one or more sessions, reduce wasted resources, and optimize resource utilization or resource capacity.

Figure 3:
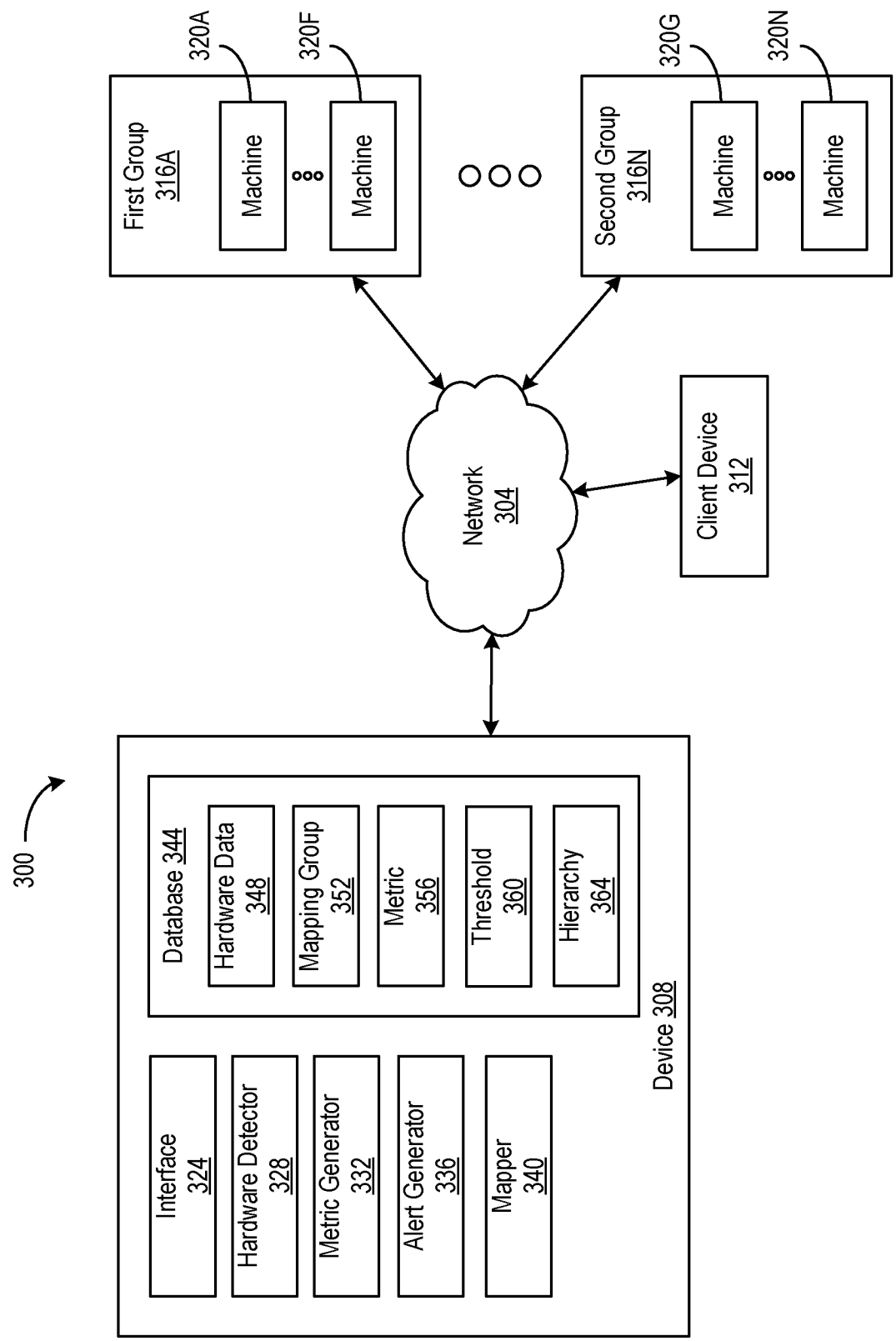
FIG. 3 is a block diagram of an example system for effectively allocating computing resources to end-users, in accordance with one or more implementations.

Referring to FIG. 3, depicted is a block diagram of one embodiment of a system 300 for effectively allocating computing resources to end-users. The system 300 can include at least one network 304, at least one device 308, at least one client device 312, and one or more groups 316A-N (sometimes generally referred to as group(s) 316 or server (s)). Although group 316A is shown as a first group and group 316N is shown as a second group, any of the groups 316 can be considered as a first, second, third, fourth group, etc. Individual groups 316 can include one or more machines 320A-N (sometimes referred to as machine(s) 320). The components (e.g., network 304, device 308, client device 312, or machine 320) of the system 300 can include or be composed of hardware, software, or a combination of hardware and software components. The one or more components (e.g., network 304, device 308, client device 312, or machine 320) of the system 300 can establish communication channels or transfer data via the network 304. For example, the client device 312 can communicate with at least one of the device 308 or the machine 320 via the network 304. In another example, the device 308 can communicate with other devices, such as the client device 312 or the machine 320 via the network 304. The communication channel between various different network devices can communicate with each other via the network 304 or different networks 304.

The network 304 can include computer networks such as the Internet, local, wide, metro or other area networks, intranets, satellite networks, other computer networks such as voice or data mobile phone communication networks, and combinations thereof. The network 304 may be any form of computer network that can relay information between the one or more components of the system 300. The network 304 can relay information between client devices 312 and one or more information sources, such as web servers or external databases, amongst others. In some implementations, the network 304 may include the Internet and/or other types of data networks, such as a local area network (LAN), a wide area network (WAN), a cellular network, a satellite network, or other types of data networks. The network 304 may also include any number of computing devices (e.g., computers, servers, routers, network switches, etc.) that are configured to receive and/or transmit data within the network 304. The network 304 may further include any number of hardwired and/or wireless connections. Any or all of the computing devices described herein (e.g., client device 312, device 308, machines 320, etc.) may communicate wirelessly (e.g., via WiFi, cellular, radio, etc.) with a transceiver that is hardwired (e.g., via a fiber optic cable, a CAT5 cable, etc.) to other computing devices in the network 304. Any or all of the computing devices described herein (e.g., client device 312, device 308, machines 320, etc.) may also communicate wirelessly with the computing devices of the network 304 via a proxy device (e.g., a router, network switch, or gateway). In some implementations, the network 304 can be similar to or can include the network 170 or a computer network accessible to the computer 100 described herein above in conjunction with FIG. 1A or 1B.

The system 300 can include or interface with at least one client device 312 (or various client devices 312). Client device 312 can include at least one processor and a memory, e.g., a processing circuit. The client device 312 can include various hardware or software components, or a combination of both hardware and software components. The client devices 312 can be constructed with hardware or software components and can include features and functionalities similar to the client devices 165 described hereinabove in conjunction with FIGS. 1A-B. For example, the client devices 165 can include, but is not limited to, a television device, a mobile device, smart phone, personal computer, a laptop, a gaming device, a kiosk, or any other type of computing device.

The client device 312 can include at least one interface for establishing a connection to the network 304. The client device 312 can communicate with other components of the system 300 via the network 304, such as the device 308 or the machines 320. For example, the client device 312 can communicate data packets with one or more machines 316 via the network 304. The client device 312 can communicate with the device 308 via the network 304. The client device 312 can transmit data packets to the device 308 configured to select and forward the data packets from the client device 312 to at least one machine 320. In some cases, the client device 312 can communicate with other client devices 312.

The client device 312 can include, store, execute, or maintain various application programming interfaces ("APIs") in the memory (e.g., local to the client device 312). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol described hereinabove in conjunction with clients 165 of FIG. 1B. The client device 312 can use at least one of various protocols for transmitting data to the machine 320. The protocol can include at least a transmission control protocol ("TCP"), a user datagram protocol ("UDP"), or an internet control message protocol ("ICMP"). The data can include a message, a content, a request, or otherwise information to be transmitted from the client device 312 to a machine 320. The client device 312 can establish a communication channel or a communication session with a machine 320 and transmit data to the machine 320. The client device 312 can establish a communication session or channel with the machine 320 via the network 304 or other intermediary devices. In some cases, the client device 312 can transmit data to the machine 320 to be forwarded or relayed to the device 308. In some other cases, the client device 312 can transmit data directly to the device 308. In some cases, data from the client device 312 to the machine 320 can be intercepted by the device 308.

The client device 312 can be assigned to a machine 320 (e.g., at least one physical or virtual machine). For instance, the client device 312 can establish a session with a machine 320 hosting at least one session. The machine 320 can be a dedicated VDI machine or a single session machine assigned to a user. In some cases, the machine 320 can be a multi-session machine assigned to one or more users. The client device 312 can access the machine 320 via an application (e.g., network application) by providing valid credentials to the machine 320. For example, the client device 312 can provide or transmit credentials input by the user to launch a session or access a cloud service on the machine 320. Upon establishing or launching the session, the client device 312 can access resources from the machine 320, such as resources hosted by the machine 320 or resources communicated between the machine 320 and other sources. The other sources can include cloud services, remote devices, data repositories, among others.

The system 300 can include or interface with one or more machines 320. The machine 320 may be referred to as a host system, a server, a cloud device, a remote device, a remote entity, or a physical machine. One or more of the machines 320 can include, be, or be referred to as a node, remote devices, remote entities, application servers, or backend server endpoints. The machine 320 can be composed of hardware or software components, or a combination of both hardware or software components. The machine 320 can include resources for executing one or more applications, such as SaaS applications, network applications, or other applications within a list of available resources maintained by the machine 320. The machine 320 can include one or more features or functionalities of at least resource management services (e.g., resource management services 202) or other components within the cloud computing environment (e.g., cloud computing environment 214), such as in conjunction with FIGS. 2A-C. The machine 320 can communicate with the client device 312 via a communication channel established by the network 304, for example.

The machine 320 can communicate data packets or traffic with at least the client device 312. The machine 320 can serve or handle traffic from client devices 312. The machine 320 can be associated with a hash in a group 316 of machines 320. In some cases, the machine 320 can communicate with the device 308. In some cases, the machine 320 can receive data from the client device 312 via the device 308. For instance, the device 308 can receive traffic or intercept traffic from the client device 312, and the machine 320 can receive the traffic from the device 308.

The machine 320 can host one or more virtual machines. For instance, the machine 320 can be a physical machine hosting various virtual machines. The machine 320 can include features or functionalities similar to a cloud computing environment 214 to provide resources for applications or services accessed by the client device 312. Individual virtual machines can be associated with a session. The machine 320 can provide the client device 312 with resources via an established session. In some cases, the machine 320 can include or maintain a log of historical hardware performance, such as CPU utilization, RAM utilization, network bandwidth, read or write speed, etc. In some cases, data regarding the performance of individual machines 320 can be stored or maintained by a service, such as VDI, VDA, or other sources or services. The machine 320 may provide historical data (e.g., workload, resource consumption, resource capacity, hardware configuration, etc.) to other entities or devices, such as the device 308. In some cases, the machine 320 can include one or more features, functionalities, components, or perform one or more operations of the device 308, such as performance analytics, communication with other machines, or transferring users to different groups 316. The machine 320 may be remote from the device 308. In some cases, the machine 320 can include the device 308 (or one or more components of the device 308) as part of the machine 320.

The machines 320 can be assigned to one or more groups 316. The group 316 can represent or indicate a type of hardware configuration or a range of hardware configurations for the listing of machines 320, such as hardware configuration embedded, installed, assigned, or provided to the machines 320. The hardware configuration can include a total resource capacity, (e.g., total processing or memory resources for utilization), bandwidth capability (e.g., read or write speed), benchmark score, graphic processing unit (GPU) capacity, among other types of resources. For instance, a first group of machines 320 can include a first hardware configuration, a second group of machines 320 can include a second hardware configuration, etc. Each group of machines 320 can include different hardware configurations. In some cases, machines 320 from the first group can include higher performance (e.g., higher resource capacity for higher resource utilization or higher-end hardware configuration) than machines 320 from the second group. In some other cases, the machines 320 from the first group may include lower performance (e.g., lower resource capacity) than the machines 320 from the second group. Machines 320 with similar hardware configuration can be assigned to the same group 316.

In some cases, individual machines 320 can be assigned to multiple groups 316. For example, a first set of groups 316 can be associated with CPU capacity or processing power, a second set of groups 316 can be associated with memory capacity (e.g., RAM) or storage capacity, a third set of groups 316 can be associated with network speed, read and write speed, or traffic bandwidth, etc. In this example, the first set of groups 316 can include a listing of machines 320 based on the processing resources, the second set of groups 316 can include a listing of machines 320 based on memory resources, and the third set of group 316 can include a listing of machines 320 based on network resources. In some cases, the groups 316 can be based on a combination of performance indicators, such as processing and memory resources, processing resource and network speed, memory resource and network speed, or other combinations of hardware information, not limited to the aforementioned hardware configurations.

The machine 320 assigned to a user can include or maintain a user profile (e.g., user settings, configurations, applications, etc.). The user profile may include, correspond to, or be a part of an image, such as a master image or a system image including at least the state of the machine 320, files local to the machine 320, among other programs, data, or settings. The user profile can be specific to the machine 320 (e.g., not included in other machines 320) and associated with the user. The machine 320 can transfer the user profile to a different machine 320 in one or more groups 316 (e.g., the same or different groups 316). For instance, the machine 320 can transmit the user profile to the device 308 for forwarding to a second machine, or vice versa. Upon receiving a user profile, the second machine can be built or installed with various software components using the image of the user profile, for instance, cloning, copying, reading, or merging with the image of the user profile on the new machine.

Individual machines 320 can be associated with or assigned an identifier or identification number. The identifier of individual machines 320 can differ. The machines 320 can be listed, identified, or communicated with via the identifier. The machine 320 (or the device 308) can move the user to a different machine 320 using a service (e.g., a broker service) offering a set of APIs configured to transfer system image or user profiles between machines 320. The APIs can include or be provided via a script, code, calls, or programming applications. In some cases, the machine 320 can delegate user profile migration tasks or processes to the device 308. For instance, the device 308 can extract a user profile from a first machine of a first group and insert the user profile in a second machine of a second group. In another instance, the machine 320 can receive a command or instruction from the device 308 to initiate a migration of the user profile to a different machine 320. The instruction can include an identifier of a machine 320 to transfer the user profile.

The system 300 can include at least one device 308. The device 308 can include various components to determine configurations (e.g., hardware configurations), user activities, machine performance, resource utilization, or resource capacity of the machines 320. The device 308 can include at least one interface 324, at least one hardware detector 328, at least one metric generator 332, at least one alert generator 336, at least one mapper 340, and at least one database 344. The database 344 can include at least one hardware data storage 348, at least one mapping group storage 352, at least one metric storage 356, at least one threshold storage 360, and at least one hierarchy storage 364. Individual components (e.g., interface 324, hardware detector 328, metric generator 332, alert generator 336, mapper 340, or database 344) of the device 308 can be composed of hardware, software, or a combination of hardware and software components. Individual components of the device 308 can be in electrical communication with each other. For instance, the interface 324 can exchange data or communicate with the hardware detector 328, metric generator 332, alert generator 336, mapper 340, or database 344. The one or more components of the device 308 can be used to perform features or functionalities, such as identifying the hardware configuration of the one or more machines 320, generating a metric for machine utilization or activities (e.g., resource consumption or resource capacity), re-mapping users, and alerting administrators. The device 308 can operate remotely from the machine 320 or other devices in the system 300. In some cases, the device 308 can be a part of one or more machines 320, such as an integrated device, embedded device, a server-operated device, or a device accessible by the administrator of one or more machines 320 hosting one or more sessions. For example, the device 308 can perform operations local or on-premise to the machine 320.

The interface 324 can interface with the network 304, devices within the system 300 (e.g., client devices 312 or machines 320), or components of the device 308. The interface 324 can include features and functionalities similar to the communication interface 115 to interface with the aforementioned components, such as in conjunction with FIG. 1A. For example, the interface 324 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 324 can include at least a built-in network adapter, network interface card, PCMCIA network card, EXPRESSCARD network card, card bus network adapter, wireless network adapter, USB network adapter, modem, or any other device suitable for interfacing one or more devices within the system 300 to any type of network capable of communication. The interface 324 can communicate with one or more aforementioned components to receive data from at least one of the client devices 312 or the machines 320 (e.g., live data or historical data), such as data associated with the resource events (e.g., resource consumption or capacity) of machines 320.

The hardware detector 328 can identify or obtain information regarding various mapping groups stored in the database 344. The mapping group can refer to a mapping between one or more users to a corresponding one or more machines 320 of a group 316. For example, the hardware detector 328 can identify at least a first mapping group and a second mapping group of the various mapping groups. The hardware detector 328 can identify that the first mapping group maps a first group of one or more users to a corresponding one or more machines 320 of a first group. The hardware detector 328 can identify that the second mapping group maps a second group of one or more users to a corresponding one or more machines 320 of a second group. The hardware detector 328 can identify other mapping groups, such as a third, fourth, fifth mapping groups, etc.

The hardware detector 328 can identify, determine, or obtain data associated with hardware configuration for one or more machines 320 or corresponding to the groups 316 from the database 344, virtual application and desktop environment (VAD), workspace, or other sources. The data representing the hardware configuration can include resource capacity, such as the capacity of the CPU, RAM, network bandwidth, etc. associated with individual groups 316 or machines 320. In some cases, the data can include the type, model, or specification of the components of the machines 320, such as CPU model, frequency, threads, processes, cores, cache, memory capacity, frequency, latency, disk capacity or availability, rated (e.g., manufacturer certified) or tested performance of the components, etc. The hardware detector 328 can use at least one parameter of the data to identify the hardware configuration (e.g., capability, allocated resources, or total resource capacity) corresponding to the group 316, such as CPU or RAM (e.g., individual processing or memory capacity), among other types of capacity. In some cases, the hardware detector 328 can use a combination of parameters to identify the hardware configuration, such as CPU and RAM (e.g., total capacity from the combination of processing and memory resources), among other types of capacity.

Machines 320 within a respective group 316 can include or have a corresponding hardware configuration for hosting sessions for the users assigned to the one or more machines 320. For example, the a first group of machines 320 in the first group can include a first hardware configuration, and a second group of machines 320 in the second group can include a second hardware configuration. The hardware configuration (or at least part of the hardware configuration) of machines 320 in the respective groups 316 can be different. For instance, machines 320 of the first group can correspond to a higher hardware configuration (e.g., higher resource capacity or performance) compared to machines 320 of the second group. Alternatively, for example, machines 320 of the first group can correspond to a lower hardware configuration (e.g., lower resource capacity or performance) compared to machines 320 of the second group.

The hardware detector 328 can detect or obtain hardware configuration information corresponding to machines 320 at predetermined time intervals. For example, the hardware detector 328 can check for new machines, removed machines (e.g., one or more machines 320 removed from service or put in maintenance mode), or modified machines (e.g., modification to existing machines, which may increase or decrease resource capacity) at predetermined time intervals. The time intervals can include at least one of every 5 minutes, 10 minutes, 30 minutes, 1 hour, 6 hours, among other intervals configurable by the administrator. In some cases, the hardware detector 328 can detect hardware configuration dynamically, such as in response to receiving information from the VAD. For example, the hardware detector 328 can detect hardware configuration in response to an indication of a new machine (e.g., employed machine assigned to a group 316), modification to existing machines, or machines 320 removed from operation.

In some cases, the hardware detector 328 can assign one or more machines 320 to a group 316 with machines 320 corresponding to similar hardware configuration, at least in part. For instance, the hardware detector 328 can assign individual machines 320 to a group 316 in response to the detection of the hardware configuration. The hardware detector 328 can store mappings of machines 320 to different groups 316 in the database 344. In some cases, the hardware detector 328 can receive or obtain existing mappings between machines 320 and groups 316 from the database 344 or other sources.

In some cases, the hardware detector 328 can organize or identify an organization of the groups 316 in a hierarchy based on computing capacities of machines 320 in a corresponding group 316. For example, the hardware detector 328 can detect or determine the computing capacity (or other parameters) of machines 320 for a respective group 316 housing or including machines 320 with similar hardware configuration. The hardware detector 328 can assign stack, arrange, or otherwise assign the group 316 based on the hardware configuration, at least in part. The hardware detector 328 can arrange the groups 316 from lowest to highest or from highest to lowest hardware configuration, such as computing capacity (e.g., total resources), average available capacity when executing user sessions over time, or average resource utilization when executing user sessions over time. The hardware detector 328 (or other components of the device 308) can store, manage, or modify the hierarchy of the group 316 in the database 344.

The metric generator 332 can determine or generate one or more metrics for individual machines 320. The metric generator 332 can receive historical or live data regarding events, statuses, or performance of the machine 320. For example, the data can include at least CPU, RAM, downtime, failure rate, network bandwidth, read/write speed, etc. over a period of time (e.g., a day, week, month, etc.). The metric generator 332 may aggregate the data, such as determining the average, mean, median, or other aggregation techniques of the performance indicator. Based on the data, the metric generator 332 can generate one or more metrics for the machine 320. The metric can indicate at least one of a computing resource utilization (e.g., processing resource consumption, memory resource consumption, etc.) or a computing capacity (e.g., total processing resources or memory resources available to the user) of the machine 320 when executing one or more sessions of a user over time. The computing capacity can be based on the hardware configuration of the respective machine 320. In some cases, the computing capacity can correspond to or be based on computing resource utilization of the machine 320. The metric may provide other indications of the performance, events, or usage of the machine 320. The metric may represent the performance of the machines 320 or the ability to handle workload by the users.

In some cases, the metric generator 332 can use one parameter from the data to generate a metric. For example, the metric generator 332 can generate a metric indicating computing resource utilization or capacity (e.g., unutilized or available resources) based on processing resource consumption over time (e.g., an average CPU utilization over a week user activities). In another example, the metric generator 332 can generate a metric based on memory consumption over time. In these examples, the metric generator 332 can generate the metric indicating computing resource consumption in correlation with any of the resource consumption information.

In some other cases, the metric generator 332 can use multiple parameters from the data to generate a metric. For instance, the metric generator 332 can generate a metric of computing resource consumption based on aggregated (e.g., average, median, etc.) processing and resource consumptions. In this case, if the processing resource consumption is 50% and the resource consumption is 100%, the metric generator 332 can generate a metric indicating 75% (e.g., ratio 75:100, etc.) computing resource consumption.

In some cases, the metric generator 332 can generate multiple metrics corresponding to individual machines 320. For instance, the metric generator 332 can generate at least one of a first metric indicating computing resource utilization (sometimes referred to as resource consumption), a second metric indicating available computing resources (sometimes referred to as available computing capacity or resource capacity), or a third metric indicating computing capacity (sometimes referred to as total computing capacity). In this case, the first metric can indicate total resources utilized by the user, the second metric can be the opposite of the first metric (e.g., available capacity based on the usage), and the third metric can indicate the overall capacity capable by the machine 320 (or the respective group 316).

In some cases, the metric generator 332 may delegate a task to one or more machines 320 for generating the one or more metrics. The metric generator 332 can store one or more metrics (e.g., generated metrics or obtained from one or more machines 320) in the database 344. The metric generator 332 may access, retrieve, or obtain at least one metric from the database 344. The metric generator 332 may be configured to generate the metric at predetermined time intervals. The metric generator 332 may be configured to generate the metric dynamically, such as in response to receiving new data from one or more machines 320. The metric generator 332 may generate the metric before, during, or after the user accesses a session executing on the machine 320, such as to determine whether to re-map the user. Although the examples herein use processing and memory resources, other parameters (e.g., network speed, read/write speed, graphic processing resources, etc.) can be used for representing the performance of the machines 320 and utilization by the user.

In some cases, the metric generator 332 can determine a metric based on aggregated resource consumption or capacity over a time interval, such as within a day, week, month, etc. of executing one or more sessions of the user. For example, the metric generator 332 can average the resource consumption of the user throughout a time interval when launching a session on the machine 320. The metric generator 332 may filter out certain data, such as 1% high or 1% low resource consumption within a time period, data within a given day, data from one or more days, etc. The metric generator 332 can use the averaged computing resource consumption to generate a metric. The metric generator 332 can forward the metric to one or more components of the device 308, such as the alert generator 336 or the mapper 340. In some cases, the metric can be associated with or correspond to at least a part of the hardware configuration of the group 316 having the machine 320. For instance, the metric can indicate hardware configuration capacity or ability to handle workload or traffic from users.

In some cases, the metric generator 332 can generate a third metric indicating computing resource consumption when transferring the user from a first machine to a second machine. For example, the metric generator 332 can compare a first hardware configuration of the first machine and a second hardware configuration of a second machine in a different group from the first machine. The comparison between hardware configurations can indicate the performance difference (e.g., difference between computing capacities). The metric generator 332 can map or associate a first metric indicating resource utilization of the first machine to a second metric indicating computing capacity on the second machine to determine total capacity usage on the second machine. Accordingly, the metric generator 332 can generate a third metric indicating a predicted resource utilization or available computing capacity subsequent to transferring the user to the second machine.

In some cases, the metric generator 332 can generate a third metric (or another metric) indicating computing resource utilization of another machine 320 (e.g., a second machine) established for another user (e.g., a second user). In some cases, the metric generator 332 can generate the third metric indicating the available computing capacity of the second machine. The metric generator 332 can provide the third metric to the alert generator 336 or the mapper 340 for transferring the second user or swapping machines associated with the first user and the second user, for example.

The alert generator 336 can generate an alert, report, notification, or indicator based on at least the metric of the machine 320. The alert generator 336 may generate an alert based on metrics from multiple machines 320. The alert generator 336 can compare the metric to at least one threshold. The threshold can include at least one of an indication of a minimum computing resource utilization, a maximum computing resource utilization, a minimum computing capacity, or a maximum computing capacity, among others. For example, to fail the minimum threshold, the resource utilization may be below one of 10%, 20%, 30%, etc., and to fail the maximum threshold, the resource may be above one of 80%, 85%, 90% etc. In another example, to fail the minimum threshold, the resource capacity may be 70%, 80%, 90%, etc., and to fail the maximum threshold, the resource capacity may be 10%, 15%, 20%, etc. The resource utilization or consumption can be represented as a percentage, value, or other characters based on the type of resources (e.g., number of cores, number of threads, uptime, network bandwidth, etc.).

In some cases, the alert generator 336 may compare the resource consumption of a machine 320 to one of a maximum or minimum utilization threshold. In response to the resource consumption exceeding or failing the threshold, the alert generator 336 can generate an alert for the administrator including, for instance, the machine 320 within a list of one or more machines 320, a recommended action for individual machines 320, and an indication (e.g., summary or explanation) on the identified or selected machine 320. In some cases, the alert generator 336 can compare the available computing capacity of the machine 320 similar to the computing resource utilization. For instance, similar to comparing the computing resource utilization to a maximum or minimum threshold, the alert generator 336 can compare the available computing capacity to a minimum or a maximum threshold, respectively. The alert generator 336 can compare other parameters indicative of machine performance and user utilization to an associated threshold.

The alert generator 336 can transmit or provide the alert to one or more remote devices within the network 304, such as an administrator device. For example, the alert generator 336 can provide the alert to the administrator device indicating one or more machines 320 failing at least one of the thresholds. The alert can include at least a list of one or more machines 320 and at least one recommended action to perform on the individual machines 320. The action can include moving the user associated with the respective machine 320 to a different machine 320 of a different group 316. The alert generator 336 can select the action as a recommendation or to initiate based on the metric failing or not satisfying a respective threshold.

For example, the alert generator 336 can select an action for moving the user to a higher hardware configuration group (e.g., group 316 with higher performance machines compared to the current group) based on the resource consumption failing a maximum utilization threshold or resource capacity failing a minimum capacity threshold. In another example, the alert generator 336 can select an action for moving the user to a lower hardware configuration group (e.g., group 316 with lower performance machines) based on the resource consumption failing a minimum utilization threshold or the resource capacity failing a maximum capacity threshold.

The alert generator 336 can determine or select one or more groups 316 to reallocate the users. The alert generator 336 can select a group 316 based on at least one of a first hardware configuration of a first group, a second hardware configuration of a second group, a first metric indicating resource consumption by a first machine in the first group, and a second metric indicating computing capacity (e.g., ability to handle workload) of a second machine (among other machines 320) in the second group. For example, the alert generator 336 can compare the first hardware configuration and the second hardware configuration to determine the difference in performance (e.g., higher or lower performance). The alert generator 336 can identify a subset of groups 316 based on the second hardware configuration having either higher or lower performance compared to the first hardware configuration.

In further example, the alert generator 336 can compare the first metric to the second metric of machines 320 from various groups 316 to identify a group 316 with a computing capacity, which when utilized by the user (e.g., based on the first metric), results in computing resource consumption within a range. The range include, for example, 40% to 70%, 50% to 60%, 55% to 60%, 60% to 75%, among other ranges. Satisfying the range can indicate that the machine 320 of the group 316 is capable of handling (at least sufficiently) the traffic of the user. Accordingly, based on the second metric indicating a computing capacity satisfying the range for handling the first metric, the alert generator 336 may select at least one machine 320 from the second group (e.g., part of a recommended action).

The alert generator 336 can a machine 320 (e.g., a second machine) from the second group based on the availability of the machine 320. For instance, the alert generator 336 can select any machine 320 without an occupant. In some cases, the alert generator 336 may select a machine 320 with an occupant for swapping user profiles. In another example, the alert generator 336 may select a machine 320 with a transferring occupant (e.g., in the processing of transferring or scheduled for a transfer).

The alert generator 336 can signal or transmit instructions to the mapper 340 to initiate the action. For example, the alert generator 336 may receive an indication of interaction from an administrator device selecting an action. In response to a selection, the alert generator 336 may alert the mapper 340 to initiate the selected action. In some cases, the alert generator 336 may provide the administrator with an option to initiate an automatic action (e.g., automatically identify metrics failing thresholds and machines to initiate user transfer). In response to an indication to initiate the automatic action, the alert generator 336 can signal the mapper 340 to initiate automated operations without additional inputs, such as action or machine selection by the administrator.

The mapper 340 can re-map a user from a first mapping group to a second mapping group. The mapper 340 can initiate the re-mapping based at least in part on the first metric for a first machine and a second metric (e.g., of one or more machines 320 of a different group). The mapping group can include or correspond to a mapping between the user and a machine 320 of a group 316. For example, a first mapping group can correspond to a user mapped to a first machine of a first group and a second mapping group can correspond to the user mapped to a second machine of a second group, where different groups are associated with different hardware configurations. For example, the first machine can include a first hardware configuration and the second machine can include a second hardware configuration. Re-mapping the user from the first to the second mapping group can cause sessions of the first user to execute on the second machine with the second hardware configuration different from the first hardware configuration.

The mapper 340 can determine a group 316 to re-map the user based on a comparison of the first metric to one or more thresholds and a second metric of other groups 316. For example, the mapper 340 can compare the first metric with a first threshold established for the first mapping group (e.g., one or more machines 320 of the first group) and the second metric with a second threshold established for the second mapping group. The mapper 340 can determine whether the first metric fails the first threshold and whether the second metric satisfies the second threshold when executing one or more sessions of the user. Failing the first threshold can include resource utilization exceeding one of the maximum or minimum utilization thresholds (or capacity threshold). Satisfying the second threshold can include the second machine having the second hardware configuration capable of handling traffic from the user within a range of resource utilization, such as when executing sessions of the user. In some cases, satisfying the second threshold may include the resource utilization being below a maximum utilization threshold established for the second mapping group.

The mapper 340 can re-map the user by transferring a profile (e.g., user profile) of the first machine established for the user to the second machine, or other machines 320 similar to the second machine. The second machine may be selected by the alert generator 336 or the mapper 340 based on the second metric associated with the second machine. The mapper 340 can transfer the profile by using REST API command, PowerShell, among other sets of APIs offered by a broker service causing the profile to be assigned to a different machine. In some cases, transferring the profile can include, correspond to, or be a part of extracting a system image of the first machine to the second machine. In response to transferring the profile, the second machine can establish one or more sessions for and receive traffic from the user.

In some cases, the mapper 340 can transfer the user to a lower computing resource group. For example, the mapper 340 can determine that a first metric of a first machine fails a first threshold (e.g., minimum utilization threshold) indicating low computing resource utilization of the first machine. In this example, the mapper 340 can determine that the first machine is underutilized by the user. Accordingly, the mapper 340 can transfer the user to a second mapping group associated with a second machine with a lower computing capacity (e.g., second metric). Based on the second metric of the second mapping group, the mapper 340 can determine the second machine can execute sessions of the user within a utilization range (e.g., compared to a second threshold). Hence, the mapper 340 can reduce wasted resources (e.g., unused resources) due to the under-utilized first machine.

In some cases, the mapper 340 can transfer the user to a higher computing resource group. For example, the mapper 340 can re-map the user based at least in part on the first metric indicating computing resource utilization higher than the threshold (e.g., maximum resource utilization threshold) established for the first mapping group. In this example, the mapper 340 can re-map the user from the first mapping group (e.g., current user assigned group) to a third mapping group (or another mapping group) having a third hardware configuration for hosting sessions for various users. The third hardware configuration can be different from the first hardware configuration of the first mapping group and the second mapping group. In this example, the second hardware configuration of the second mapping group can be lower than both the first mapping group and the third mapping group. The mapper 340 can select the third machine or third mapping group based on a third metric of machines 320 in the third group indicating computing capacity capable of handling workload from the user within a given utilization range. Accordingly, the mapper 340 can improve the user experience (e.g., reduce latency, lag, downtime, etc. due to the overloaded first machine) and resource allocation for users by re-assigning users to groups 316 with correlating metrics, such as comparable resource utilization to resource capacity.

In some cases, the mapper 340 can swap or switch profiles of machines 320 from different groups 316. For example, a first mapping group (e.g., first machine of a first user) can correspond to a first hardware configuration lower than a second hardware configuration of a second mapping group (e.g., second machine of a second user). The mapper 340 can determine that a first utilization metric of the first machine fails an upper threshold (e.g., maximum utilization threshold) and a second utilization metric of the second machine fails a lower threshold (e.g., minimum utilization threshold). The mapper 340 may determine that the second machine can handle workload from the first user and the first machine can handle workload from the second user. Accordingly, the mapper 340 can swap a first profile of the first user and a second profile of the second user based at least in part on the first metric and the second metric (sometimes referred to as a third metric for the swap). Transferring the profiles can cause the sessions of the first user to execute on the second machine and sessions of the second user to execute on the first machine.

In some cases, the mapper 340 may be configured to receive a signal or an indication of interaction from an administrator to initiate an action. In some other cases, the mapper 340 can be configured to operate automatically, such as initiating an action in response to identifying a metric of at least one machine 320 failing a threshold established for the corresponding mapping group. In some cases, different thresholds can be established based on the type of user or hardware configuration. For instance, individual users can be assigned to a tolerance level, such as tolerance to interruptions, latency, lags, etc. Hence, the threshold established for the mapping group can be set higher or lower depending on the tolerance. For instance, the maximum utilization threshold can be set lower for less tolerant users or higher for more tolerant users. In some cases, individual hardware configurations or groups 316 can be assigned varying thresholds, such as based on administrator configuration, among other factors.

The database 344 may be referred to as a data repository, central storage, or memory of the device 308. The one or more storages (e.g., hardware data storage 348, mapping group storage 352, metric storage 356, threshold storage 360, or hierarchy storage 364) of the database 344 can be accessed, modified, interacted by one or more components (e.g., interface 324, hardware detector 328, metric generator 332, alert generator 336, or mapper 340) of the device 308. In some cases, the one or more storages of the database 344 can be accessed by one or more other authorized devices of the system 300, such as an administrator device managing the groups 316 of machines 320. The database 344 can include other storages to store additional data from one or more components of the device 308 or data from other devices of the system 300, for example.

The hardware data storage 348 can include store, maintain, or include data generated or obtained by one or more components of the device 308, data from one or more machines 320, or data from other components of the system 300, such as the client device 312. For example, the historical data storage 354 can store data from applications or desktop executing on the machines 320, from the VDI of the machines 320, among others. Data from the VAD can include the hardware configuration of the machines 320, such as CPU, RAM, network, etc. For example, the hardware data storage 348 can be accessed by the hardware detector 328 to identify the hardware configuration of the machines 320. In another example, the hardware data storage 348 can store data on events or activities of the machines 320, such as resource utilization, computing capacity, or available computing capacity. In this example, the hardware data storage 348 can be accessed by the metric generator 332 to generate one or more metrics for the machine 320.

The mapping group storage 352 can include, store, or maintain mapping groups in a table (e.g., hash table, etc.), linking the user to a machine 320 in a group 316. The mapping group storage 352 can include an indication or information of machines assigned to users (e.g., user profiles or identities). In some cases, the mapping group storage 352 can include mapping of machines 320 or groups 316 to the respective hardware configurations. In some cases, the mapping groups can be sorted, categorized, or ordered according to the hierarchy (e.g., hierarchy storage 364).

The metric storage 356 can store, maintain, or include the metric generated or determined by at least the metric generator 332. The metric storage 356 can store various metrics associated with individual machines 320. The metric storage 356 may be updated by the metric generator 332, among other components of the device 308. In some cases, the metric storage 356 can store metrics received from the machines 320, such as metrics generated by individual machines 320 based on activities from the user. The metric can be indicative of the performance of the respective machine 320, such as computing resource utilization, computing capacity, available computing capacity, among other performance indicators.

The threshold storage 360 can store, maintain, or include various thresholds, such as for comparison with metrics corresponding to the machines 320. The threshold storage 360 can include thresholds associated with the type of metric. For instance, utilization thresholds (sometimes referred to as consumption thresholds) can be compared with computing resource utilization metrics. In another example, capacity thresholds (sometimes referred to as performance capability or hardware configuration threshold) can be compared with computing capacity metrics. In further example, availability thresholds (sometimes referred to as available capacity thresholds) can be compared with available computing capacity metrics, such as opposite to the resource utilization metrics.

The thresholds may be predetermined or configured by the admin. The threshold can include minimum thresholds or maximum thresholds of different types. The threshold can indicate overloaded machines (e.g., if utilization exceeds a maximum threshold) or underutilized machines (e.g., if utilization exceeds a minimum threshold). In some cases, the threshold storage 360 can include ranges (e.g., between the minimum and maximum thresholds). The threshold storage 360 can be accessed by at least the alert generator 336 or the mapper 340 for comparison between metrics and thresholds. The threshold storage 360 can store an indication of thresholds assigned to respective mapping groups or machines 320.

The hierarchy storage 364 can store a hierarchy, ranking, level, or order of mapping groups. For example, the hierarchy storage 364 can sort, order, or rank groups of machines 320 based on hardware configuration or performance of the respective group 316. The hierarchy storage 364 can sort mapping groups (e.g., mapping group storage 352) from highest to lowest performance or vice versa. The hierarchy storage 364 can sort the mapping groups using other hierarchical or sorting techniques. The hierarchy storage 364 may provide hierarchies between different types of performance (e.g., CPU performance, RAM performance, etc.). In some cases, the hierarchy storage 364 can include a hierarchy between machines 320 of the same group 316, as machines 320 of the same group 316 may include slight variations in performance. Based on the hierarchy, the mapper 340 can transfer profiles to a second group below (e.g., less performance) the first group occupied by the user or a third group above (e.g., higher performance) the first group.

In some cases, the database 344 can store instructions, code, scripts, or actions that can be used to control one or more machines 320. For instance, the actions can include transferring, adding, swapping, or removing user profiles. In some cases, the actions can be obtained from the machines 320 or operated by the machines 320. In some cases, the instructions can be used by other remote devices to manage user profiles.

Figure 4:
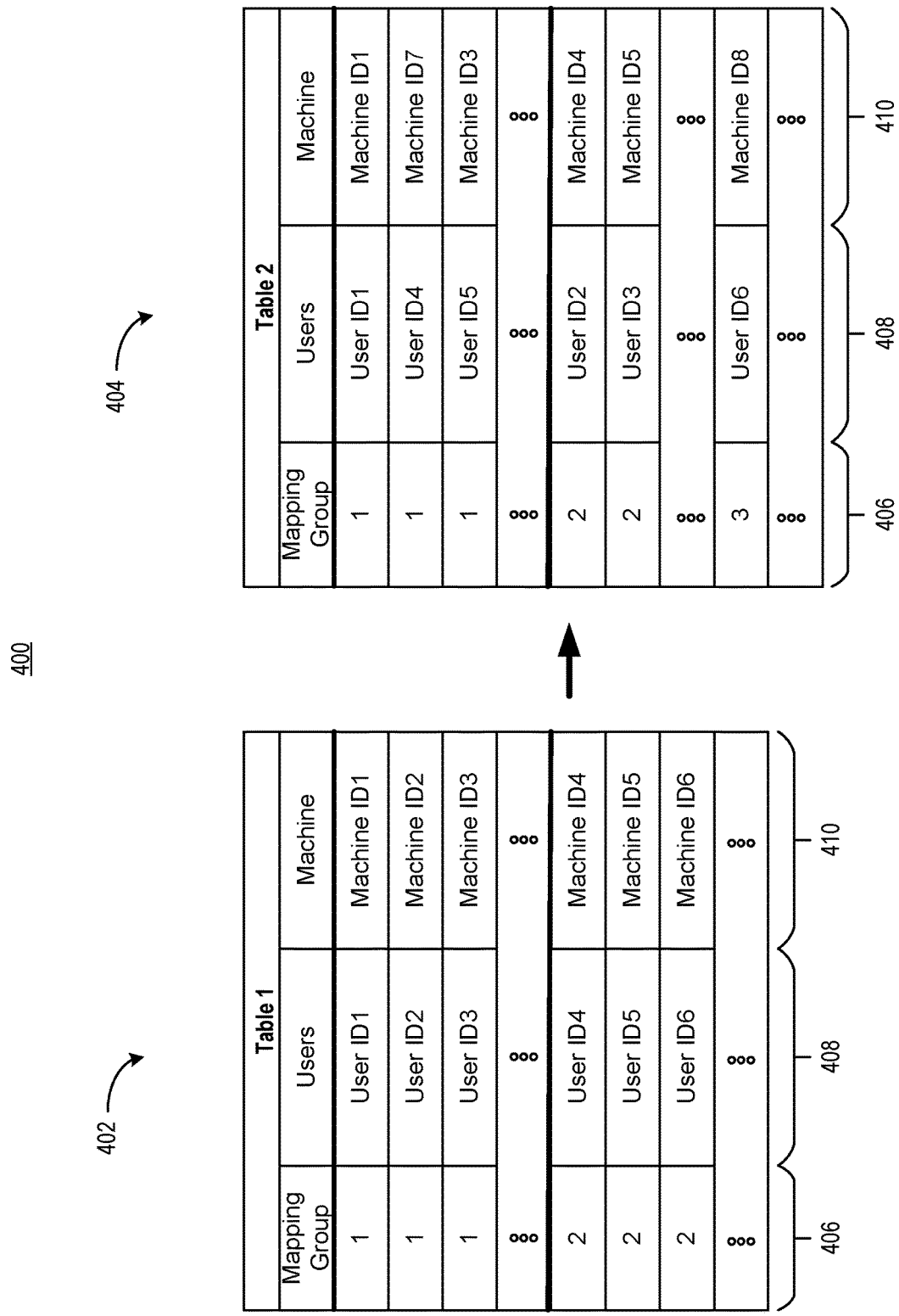
FIG. 4 is an example of tables mapping users to machines in mapping groups, in accordance with one or more implementations.

Referring to FIG. 4, depicted is an example of tables 400 mapping users to machines 320 in mapping groups 406. The operations discussed for modifying mapping groups from the first table (e.g., table 402) to the second table (table 404) can be executed, performed, or otherwise carried out by one or more components of the system 300 (e.g., device 308, machines 320, etc.), the computer 101, the cloud computing environment 214, or any other computing devices described herein in conjunction with FIGS. 1A-2C. For example, the operations can be performed by the device 308 configured to select one or more machines 320 of a first group based on a first metric, one or more machines 320 of a second group based on a second metric, and re-map a user profile of a machine 320 from a first group to a second group.

Table 402 can include one or more mapping groups 406, such as a first mapping group and a second mapping group. The first mapping group can include mapping of a first group of users (e.g., profiles 408) to a first group of machines 320. The machines 320 can be associated with machine identifiers (IDs) 410. In some cases, each mapping group 406 can correspond to a mapping of a user to a machine 320. Individual users can be associated with respective user IDs or user profiles 408. In this example, in the first mapping group, user IDs 1-3 can be associated with machine IDs 1-3, respectively. The second mapping group can include user IDs 4-6 mapped to machine IDs 4-6, respectively. Each mapping group 406 can include other machines, such as machine ID 7-N, which the IDs in these examples may represent different machines.

Table 404 can include mapping groups 406 which map users to individual machines 320 subsequent to the device 308 initiating one or more re-mappings. In this case, the user associated with user ID 1 may not be re-mapped, hence, the profile 408 of the user may remain mapped to machine ID 1. The device 308 can re-map one or more profiles 408 based at least on a first metric associated with a first machine of the user and a second metric of a second machine determined to receive the transferred profile. The mapping groups 406 as discussed in the examples herein can be in a hierarchy, such that the higher the mapping groups 406 (e.g., from groups 1 to 3), the higher the performance. For example, the device 308 can re-map user ID 4 to an unoccupied machine (e.g., machine ID 7) of the first mapping group in response to the resource utilization of machine ID 4 failing a minimum threshold. The device 308 can transfer or re-map user ID 2 to the machine ID 4 based on resource utilization of machine ID 2 failing a maximum threshold. The device 308 can transfer user ID 2 subsequent to transferring the user ID 4 to the first group.

Further, the device 308 can swap user ID 3 and user ID 5. For example, the device 308 can determine that a metric of machine ID 3 utilized by user ID 3 fails a maximum threshold. Additionally, the device 308 can determine that a metric of machine ID 5 utilized by user ID 5 fails a minimum threshold. Accordingly, the device 308 can swap the profiles 408 between machines 320 of different mapping groups 406.

In further example, the device 308 may determine that a metric of machine ID 6 utilized by user ID 6 fails a maximum threshold. In response to the determination, the device 308 can transfer the user ID 6 to a machine of a higher mapping group 406 (e.g., a third mapping group). In some cases, the device 308 can move the machine 320 to a different mapping group 406 based on hardware configuration updates (e.g., upgrade or downgrade to the machine 320). Hence, individual mapping groups 406 can represent the associated performance of the machines 320 in the group 316.

In some cases, the device 308 can move one or more profiles up or down multiple levels of the hierarchy of hardware performance. For example, a mapping group 406 can be established with multiple thresholds, such as a first maximum threshold, a second maximum threshold, a first minimum threshold, and a second minimum threshold. The device 308 can move a profile from a first mapping group to a second mapping group in response to a metric indicating resource utilization of the machine 320 failing a first maximum threshold. The second mapping group can include machines 320 having higher computing capacity than the first mapping group. If the metric fails the second maximum threshold, the device 308 can move the profile from the first mapping group to a third mapping group having machines 320 with higher computing capacity than machines 320 of the second mapping group. Similarly, the device 308 can move the profile to a fourth mapping group with lower computing capacity than the first mapping group based on the metric failing the first minimum threshold. The device 308 can move the profile to a fifth mapping group with lower computing capacity than the fourth mapping group and the first mapping group based on the metric failing the second minimum threshold.

In some cases, the device 308 can determine that the machine 320 is in the lowest performance group. If a metric of the machine 320 fails the minimum utilization threshold when executing one or more sessions, the device 308 may maintain the user on the machine 320 or may not move the profile to other machines 320. In some cases, machines 320 in the lowest performance group may not include or be established with a minimum utilization threshold. In another example, the device 308 can determine that the machine 320 is in the highest performance group. If the metric of the machine 320 fails the maximum utilization threshold, the device 308 may maintain the profile at the machine 320 or report to the administrator indicating potential upgrade to a machine group. In some cases, the highest performance group may not be established with a maximum utilization threshold, for example. In some cases, the device 308 may inform the administrator to launch new machines.

Figure 5:
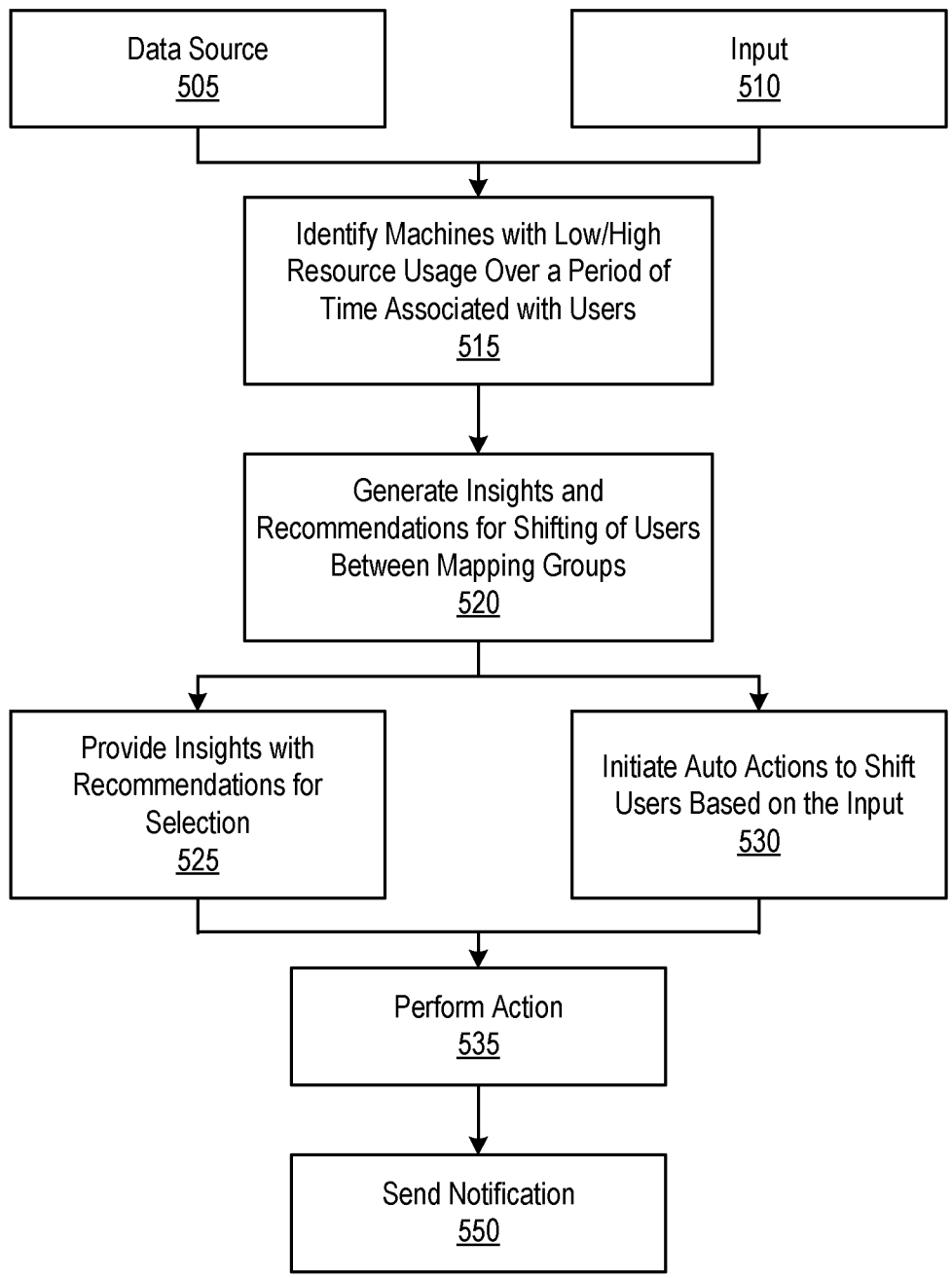
FIG. 5 is an example workflow diagram for determining and performing actions for users, in accordance with one or more implementations.

Referring to FIG. 5, depicted is an example workflow diagram 500 for determining and performing actions for users. The diagram 500 can include operations which can be executed, performed, or otherwise carried out by one or more components of the system 300 (e.g., device 308, machines 320, etc.), the computer 101, the cloud computing environment 214, or any other computing devices described herein in conjunction with FIGS. 1A-2C. For example, the operations can be performed by the device 308 configured to re-map user profiles and send at least one notification.

At operation 505, the device 308 can obtain or receive data from various sources (e.g., VAD, VID, or machines 320). The device 308 may receive data in response to an update or new information. In some cases, the device 308 can receive the data based on a time interval (e.g., 5-minutes, 30-minutes, 1 hour, daily, etc.). At operation 510, the device 308 can receive one or more inputs. The inputs may include, correspond to, or be a part of configurations, policies, or settings for the device 308. The device 308 can receive inputs from the administrator. The device 308 may provide an option to the administrator, such as frequency for performing the analysis, providing alerts, initiating re-mapping operations, executing auto-actions, etc.

At operation 515, the device 308 can identify one or more machines 320 with low or high resource usage (e.g., consumption or utilization) over a period of time associated with one or more users. Individual machines 320 can be installed with a user profile. The device 308 can detect resource usage based on the data from one or more sources regarding machine events. The resource usage can be an aggregated resource used per machine over a time period when executing one or more sessions for the user, such as throughout a week, month, etc. The device 308 can determine whether the usage is high or low by comparing the metric of the machine 320 to a threshold. For example, the device 308 can determine that the resource usage is high (e.g., overloaded machine) if the metric indicating resource usage fails a maximum threshold and that the resource usage is low (e.g., underutilized machine) if the metric fails a minimum threshold.

At operation 520, the device 308 can generate insights (e.g., an alert, report, or analysis) or recommendations for shifting one or more users between mapping groups (e.g., mapping groups 406). For example, the device 308 can provide a list of machines 320 and one or more actions to trigger for the machines 320. The action can include at least one of transferring user profile to higher or lower computing capacity machine 320, machine selection, swapping profiles, among others. The device 308 can provide insights and recommendations via a user interface (UI) to the administrator. The actions can be interactive elements within the UI for selection. The device 308 can identify a profile associated with individual machines 320 for transfer.

In some cases, at operation 525, the device 308 can initiate one or more automatic actions or operations to shift users based on the input from operation 510. The input can indicate for the device 308 to initiate auto-actions. Accordingly, the device 308 can determine one or more machines 320 associated with metrics failing at least one of the thresholds. The device 308 can determine other one or more machines 320 of at least one different group 316 having computing capacity to handle the traffic from the user based on the metric. Accordingly, the device 308 can proceed to operation 535. In some cases, the device 308 can notify the administrator of one or more actions scheduled to be executed or in response to executing an action.

At operation 535, the device 308 can proceed to perform an action. For instance, the device 308 can transfer a profile a higher performance machine group. In another example, the device 308 can transfer the profile to a lower performance machine group. In some cases, the device 308 can shift the user by multiple hierarchy levels, such as from a first group to a third group having greater deviation in performance (e.g., higher/lower) than a second group which has greater deviation in performance than the first group, for example. In some cases, the device 308 can swap a first profile with a second profile in response to the machines 320 capable of accommodating for the traffic of the respective other users (e.g., transferring the first user to the second machine and the second user to the first machine).

At operation 550, the device 308 can send or transmit a notification to one or more entities, such as an administrator device or a client device 312. For instance, the device 308 can notify the administrator of one or more transfers. The device 308 may notify the user of maintenance to transfer the previously assigned machine. The device 308 provide other notifications associated with the analysis or actions performed to the machines 320 or groups 316.

Figure 6:
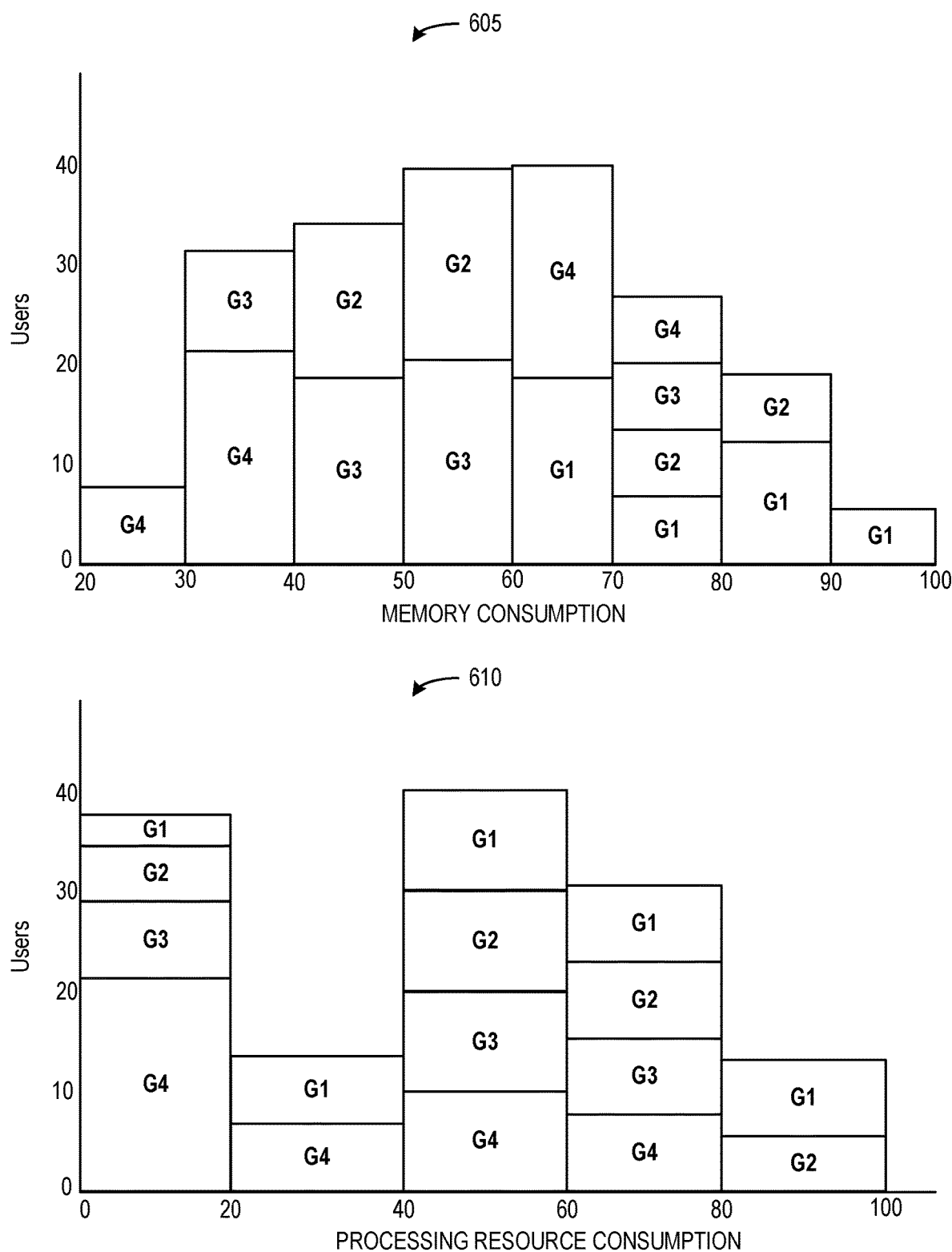
FIG. 6 is an example illustration of resource utilization graphs for mapping groups, in accordance with one or more implementations.

Referring to FIG. 6, depicted is an example illustration of resource utilization graphs for mapping groups. The graphs can include at least memory consumption graph 605 and processing resource consumption graph 610. The operations discussed for the graphs can be executed, performed, or otherwise carried out by one or more components of the system 300 (e.g., device 308, machines 320, etc.), the computer 101, the cloud computing environment 214, or any other computing devices described herein in conjunction with FIGS. 1A-2C. For example, the operations can be performed by the device 308 configured to identify memory and processing resource consumption of various mapping groups (e.g., mapping groups 406).

Graph 605 can illustrate an example of the number of users in respective mapping groups consuming certain levels of memory. Similarly, graph 610 can illustrate an example of the number of users mapping groups consuming certain levels of the processing resource. The consumption level can be in percentage, such that resource consumptions are respective to individual mapping groups instead of comparison between group performances. The device 308 can generate a metric based on at least the memory consumption, processing resource consumption, or a combination of both resources.

For example, for memory consumption, the device 308 may determine to transfer users between groups based on the metric compared to a threshold. If the threshold is set to 30% minimum and 90% maximum, the device 308 may transfer users from group 4 having consumption between 20% to 30% to a lower performance group. The device 308 may transfer users from group 1 having consumption between 90% to 100% to a higher performance group.

In another example, for processing resource consumption, the device 308 can identify a minimum threshold of 20% and a maximum threshold of 80%. The device 308 can transfer users of at least one of groups 1-4 having consumption between 0% to 20% to a lower performance group. The device 308 can transfer users of at least one of groups 1-2 having consumption between 80% to 100% to a higher performance group.

In some cases, for a combination of memory and processing resource consumption, the device 308 can determine maximum and minimum consumption thresholds for an aggregated memory consumption and processing resource consumption. For example, based on minimum thresholds for memory and processing resource consumptions of 30% and 20% respectively, the device 308 can move a subset of users from group 4 failing the thresholds to a lower performance group. Additionally, based on maximum thresholds for memory and processing resource consumptions of 90% and 80%, respectively, the device 308 can move a subset of users from group 1 failing the thresholds to a higher performance group. The device 308 can move one or more users from any group 316 based on the machine metric and configured thresholds, for example. The device 308 can use other types of resource consumption to determine whether to transfer users to a different group.

Figure 7:
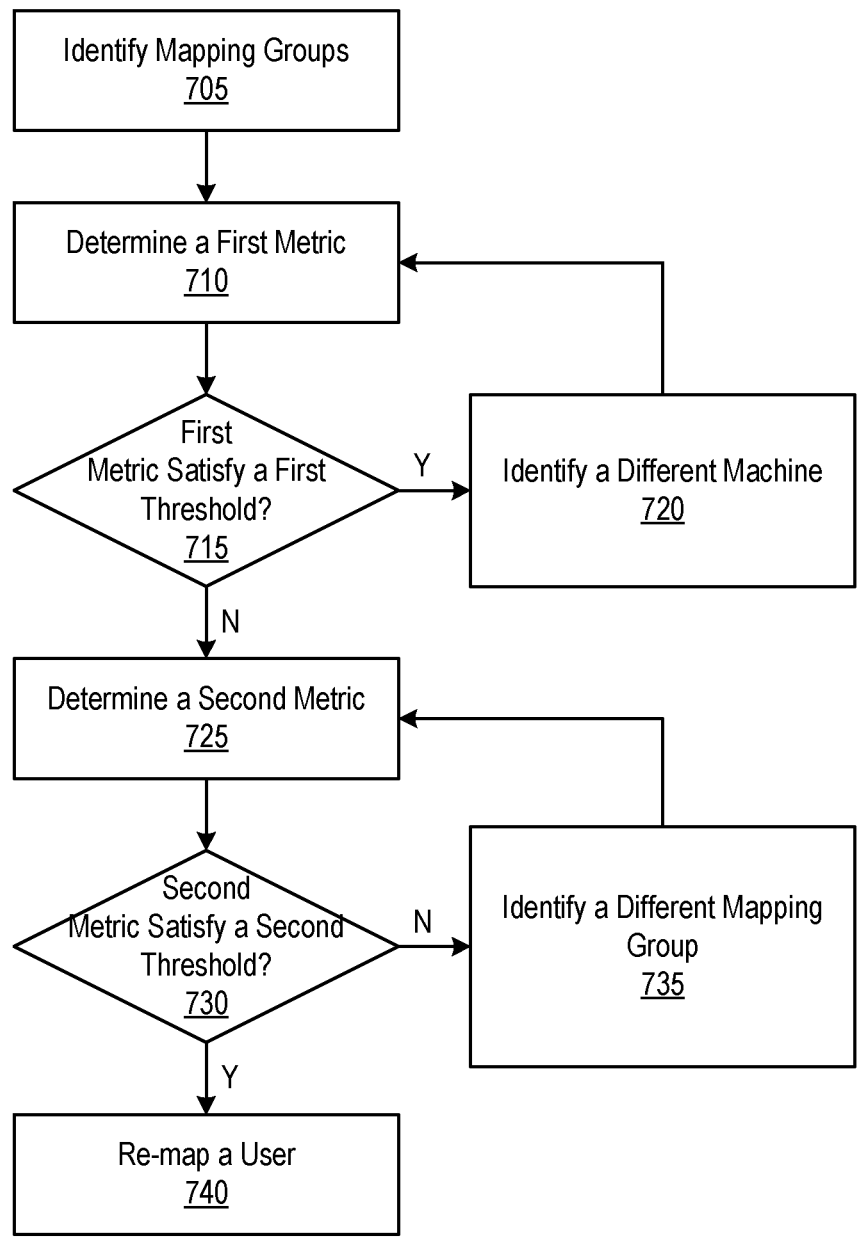
FIG. 7 is an example flow diagram of a method for effectively allocating computing resources to end-users, in accordance with one or more implementations.

FIG. 7 illustrates an example flow diagram of a method 700 for effectively allocating computing resources to end-users. The example method 700 can be executed, performed, or otherwise carried out by one or more components of the system 300 (e.g., device 308, machine 320, etc.), the computer 101, the cloud computing environment 214, or any other computing devices described herein in conjunction with FIGS. 1A-2C. The method 700 can include identifying mapping groups, at step 705. At step 710, the method 700 can include determining a first metric. At step 715, the method 700 can include determining whether the first metric satisfies a first threshold. At step 720, the method 700 can include identifying a different machine. At step 725, the method 700 can include determining a second metric. At step 730, the method 700 can include determining whether a second metric satisfies a second threshold. At step 735, the method 700 can include identifying a different mapping group. At step 740, the method 700 can include re-mapping a user.

Still referring to FIG. 7 in further detail, at step 705, a device (e.g., one or more processors, coupled to memory) can identify mapping groups. The mapping groups can include at least a first mapping group mapping a first group of users to a corresponding first group of machines, a second mapping group mapping a second group of users to a corresponding second group of machines, a third mapping group, etc. The machines in a respective mapping group can have or be associated with a hardware configuration or a certain performance range. For instance, a first group of machines can have a first hardware configuration that hosts sessions for the first group of users and the second group of machines can have a second hardware configuration that hosts sessions for the second group of users. The first hardware configuration can differ from the second hardware configuration, such as more or less computing capacity (e.g., performance or capability to handle workload).

In some cases, the mapping groups may be organized in a hierarchy based on the computing capacity of machines in each of the groups. For instance, a first level in the hierarchy can include machines in a first group, a second level in the hierarchy can include machines in a second group having higher computing capacity than the first group, a third level in the hierarchy can include machines in a third group having higher computing capacity than the second group, etc. In another example, the mapping groups may be organized in the hierarchy in descending order, such as lower computing capacity when incrementing up the levels. In some cases, the hierarchy may be based on computing resource utilization, network bandwidth, among other performance factors associated with the hardware configuration of the groups.

At step 710, the device can determine a first metric. The device can determine the first metric for the first machine. The first metric can indicate computing resource utilization of the first machine of the first group of machines when executing one or more sessions of a user in the first group. The device can aggregate resource consumption or activity data of the user overtime during the one or more sessions. For instance, the device can determine a metric indicating an average resource consumption throughout a day, week, two-weeks, etc. In some cases, the device can determine the first metric indicating available computing capacity (e.g., unused computing capacity) of the first machine.

At step 715, the device can determine whether the first metric satisfies a first threshold. The first threshold may be established for the first mapping group. The first threshold can include or correspond to the type of the first metric (e.g., utilization threshold for computing resource utilization metric or available capacity threshold for available capacity metric). The first threshold may include an upper threshold (e.g., max threshold) and a lower threshold (e.g., min threshold). For instance, the first threshold may be at least one of a maximum computing resource utilization threshold or a minimum computing resource utilization threshold. In response to failing the threshold, such as the first metric exceeding the upper threshold or lower threshold, the device can proceed to step 725. In response to satisfying the threshold, such as the first metric within the upper and lower thresholds, the device can proceed to step 720.

At step 720, the device can identify a different machine. The device can identify a different machine in the same group, such as the first group in this case. The device may identify a different machine in a different group, such as in the second group, third group, etc. Accordingly, the device can proceed to determine the metric of another machine, at step 710.

At step 725, the device can determine a second metric. The second metric can be a metric for various machines in the second group of machines. The second metric can indicate computing capacity (e.g., total computing resources for processing traffic from the user). The computing capacity of the second group of machines can be based on the second hardware configuration. Higher hardware configuration can indicate higher computing capacity and lower hardware configuration can indicate lower computing capacity. The computing capacity for machines within a group can be similar or within a range (e.g., ±5% performance deviation). In some cases, the computing capacity of the second group of machines can be based on computing resource utilization of the second group of machines. In this case, the resource utilization can indicate the aggregated amount of workload or traffic received by individual machines throughout a time period, thereby indicating the performance of the machines. For instance, based on traffic experienced by individual machines within a group, the device can identify the performance or hardware configuration of the machines capable of handling the traffic.

At step 730, the device can determine whether a second metric satisfies a second threshold. The second threshold may be established for the second mapping group. The second threshold can include or correspond to a computing capacity threshold. The second threshold can include at least one of a minimum threshold (e.g., minimum computing capacity threshold) or a maximum threshold (e.g., maximum computing capacity threshold) of the second group of machines. In some cases, the second threshold can be a range of minimum and maximum capacity.

The device can compare the second metric to the second threshold to determine whether the second group of machines have a hardware configuration or computing capacity capable of handling the load from the user based on the first metric. Handling the load can refer to maintaining computing resource consumption when executing user sessions within a range of resource utilization, which reflects the range of computing capacity to select for the user. If the second metric satisfies the second threshold, such as within the range, the device can proceed to step 740. Otherwise, if outside the range of computing capacity, the device can proceed to step 735.

At step 735, the device can identify a different mapping group. The device can search or identify a different mapping group in response to the second metric of the second group not satisfying the second threshold. The device can identify a different group based on the hierarchy of mapping groups. For instance, based on the first metric failing a maximum utilization threshold, the device can identify a different mapping group at a higher level. In another example, based on the first metric failing a minimum utilization threshold, the device can identify a different mapping group at a lower level. Accordingly, the device can determine a second metric for other mapping groups to select for re-mapping the user, such as based on at least one comparison with the second threshold.

At step 740, the device can re-map a user. The device can re-map the user based at least in part on the first metric for the first machine and the second metric (e.g., for groups of machines of the second group). For instance, the device can re-map the user based on a first comparison of the first metric with the first threshold and a second comparison of the second metric with the second threshold. The device can re-map the user in response to the first metric failing the first threshold and the second metric satisfying the second threshold. The device can re-map the user from the first mapping group to the second mapping group to cause sessions of the user to execute on one of the machines (e.g., a second machine) in the second mapping group. The second machine can include the second hardware configuration different from the first hardware configuration of the first machine. To re-map the user, the device can transfer a profile (or system image) of the first machine established for the first user to the second machine. The second machine can establish the profile for the user in response to the transfer.

In some cases, the first metric can indicate low computing resource utilization of the first machine, such as the first metric failing a minimum utilization threshold. For instance, the device can re-map, based at least in part on the first metric indicating the low computing resource utilization and the second metric (e.g., satisfying the second threshold), the user from the first mapping group to the second mapping group. In this case, the second hardware configuration can be lower than the first hardware configuration. Hence, the device can reduce wasted resources and improve the allocation of computing resources to the user.

In some other cases, the device can re-map the user based at least in part on the first metric indicating computing resource utilization higher than the first threshold (e.g., maximum utilization threshold) of the first machine. Accordingly, the device can transfer the user from the first mapping group to a third mapping group that maps a third group of users to a corresponding third group of machines. The machines of the third group can include a third hardware configuration that hosts sessions for the third group of users, which can be different from the first and second hardware configurations. In this case, the third hardware configuration can be higher than the first and second hardware configurations. Hence, the device can improve or increase resources for the user with high traffic or workload, thereby improving the allocation of computing resources to the user and improving user experience by mitigating resource spikes, lags, among other degradation factors.

In some cases, the device can determine a third metric indicating computing resource utilization of the second machine established for a second user (e.g., the second user occupying the second machine in this example). The device can compare the third metric to a third threshold established for the second machine or the second group of machines. The second group and the first group may be separated by at least one level or layer within the hierarchy, for example. The second group can include higher or lower hardware configuration compared to the first group.

The device may swap the first user and the second user (e.g., the first profile and the second profile). The device can initiate the swap based at least in part on the first metric for the first machine and the third metric for the second machine. For example, the first metric may fail a maximum threshold and the third metric may fail a minimum threshold with the second hardware configuration higher than the first hardware configuration. The device may swap the user profiles between the first machine and the second machine to cause the sessions of the first user to execute on the second machine and sessions of the second user to execute on the first machine. In another example, the first metric may fail a minimum threshold and the third metric may fail a maximum threshold with the second hardware configuration lower than the first hardware configuration. Accordingly, the device can swap the user profiles. In some cases, the device may replace one of the profiles of the machines, while identifying a different machine (e.g., a third machine for the unassigned profile).

Further Example Embodiments

The following examples pertain to further embodiments, from which numerous permutations and configurations will be apparent.

Example 1 includes a method, comprising: identifying, by one or more processors, a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users; determining, by the one or more processors, a first metric indicating computing resource utilization of a first machine of the first plurality of machines when executing one or more sessions of a first user in the first mapping group, and a second metric indicating computing capacity of the second plurality of machines; and re-mapping, by the one or more processors based at least in part on the first metric for the first machine and the second metric, the first user from the first mapping group to the second mapping group to cause sessions of the first user to execute on a second machine of the second plurality of machines with the second hardware configuration different from the first hardware configuration.

Example 2 includes the subject matter of Example 1, comprising re-mapping the first user based on a first comparison of the first metric with a first threshold established for the first mapping group and a second comparison of the second metric with a second threshold established for the second mapping group.

Example 3 includes the subject matter of any of Examples 1 and 2, wherein the first threshold indicates a minimum computing resource utilization or a maximum computing resource utilization for the first plurality of machines, and wherein the second threshold indicates a minimum computing capacity or a maximum computing capacity of the second plurality of machines.

Example 4 includes the subject matter of any of Examples 1 through 3, wherein the first metric indicates low computing resource utilization of the first machine, and the method further comprises: re-mapping, by the one or more processors based at least in part on the first metric indicating the low computing resource utilization and the second metric, the first user from the first mapping group to the second mapping group.

Example 5 includes the subject matter of any of Examples 1 through 4, comprising re-mapping, by the one or more processors based at least in part on the first metric indicating computing resource utilization higher than a threshold of the first machine, the first user from the first mapping group to a third mapping group of the plurality of mapping groups, the third mapping group mapping a third plurality of users to a corresponding third plurality of machines having a third hardware configuration that hosts sessions for the third plurality of users, the third hardware configuration different from the first hardware configuration and the second hardware configuration.

Example 6 includes the subject matter of any of Examples 1 through 5, wherein the plurality of mapping groups are organized in a hierarchy based on computing capacity of a plurality of machines in each of the plurality of mapping groups.

Example 7 includes the subject matter of any of Examples 1 through 6, wherein the computing capacity of the second plurality of machines is based on the second hardware configuration.

Example 8 includes the subject matter of any of Examples 1 through 7, further comprising: wherein the computing capacity of the second plurality of machines is based on computing resource utilization of the second plurality of machines.

Example 9 includes the subject matter of any of Examples 1 through 8, comprising: transferring, by the one or more processors, a profile of the first machine established for the first user to the second machine of the second plurality of machines to establish the second machine for the first user.

Example 10 includes the subject matter of any of Examples 1 through 9, comprising: determining, by the one or more processors, a third metric indicating computing resource utilization of the second machine established for a second user; and swapping, by the one or more processors based on at least in part on the first metric for the first machine and the third metric for the second machine, a first profile of the first user from the first machine and a second profile of the second user from the second machine to cause the sessions of the first user to execute on the second machine and sessions of the second user to execute on the first machine.

Example 11 includes a system, comprising: one or more processors, coupled to memory, configured to: identify a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users; determine a first metric indicating computing resource utilization of a first machine of the first plurality of machines when executing one or more sessions of a first user in the first mapping group, and a second metric indicating computing capacity of the second plurality of machines; and re-map, based at least in part on the first metric for the first machine and the second metric, the first user from the first mapping group to the second mapping group to cause sessions of the first user to execute on a second machine of the second plurality of machines with the second hardware configuration different from the first hardware configuration.

Example 12 includes the subject matter of Example 11, wherein the one or more processors are further configured to: re-map the first user based on a first comparison of the first metric with a first threshold established for the first mapping group and a second comparison of the second metric with a second threshold established for the second mapping group.

Example 13 includes the subject matter of any of Examples 11 and 12, wherein the first threshold indicates a minimum computing resource utilization or a maximum computing resource utilization for the first plurality of machines, and wherein the second threshold indicates a minimum computing capacity or a maximum computing capacity of the second plurality of machines.

Example 14 includes the subject matter of any of Examples 11 through 13, wherein the first metric indicates low computing resource utilization of the first machine, and the one or more processors are further configured to: re-map, based at least in part on the first metric indicating the low computing resource utilization and the second metric, the first user from the first mapping group to the second mapping group.

Example 15 includes the subject matter of any of Examples 11 through 14, wherein the one or more processors are further configured to: re-map, based at least in part on the first metric indicating computing resource utilization higher than a threshold of the first machine, the first user from the first mapping group to a third mapping group of the plurality of mapping groups, the third mapping group mapping a third plurality of users to a corresponding third plurality of machines having a third hardware configuration that hosts sessions for the third plurality of users, the third hardware configuration different from the first hardware configuration and the second hardware configuration.

Example 16 includes the subject matter of any of Examples 11 through 15, wherein the plurality of mapping groups are organized in a hierarchy based on computing capacity of a plurality of machines in each of the plurality of mapping groups.

Example 17 includes the subject matter of any of Examples 11 through 16, wherein the computing capacity of the second plurality of machines is based on the second hardware configuration.

Example 18 includes the subject matter of any of Examples 11 through 17, wherein the computing capacity of the second plurality of machines is based on computing resource utilization of the second plurality of machines.

Example 19 includes a non-transitory computer readable storage medium storing instructions that, when executed by one or more processors, cause the one or more processors to: identify a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users; determine a first metric indicating computing resource utilization of a first machine of the first plurality of machines when executing one or more sessions of a first user in the first mapping group, and a second metric indicating computing capacity of the second plurality of machines; and re-map, based at least in part on the first metric for the first machine and the second metric, the first user from the first mapping group to the second mapping group to cause sessions of the first user to execute on a second machine of the second plurality of machines with the second hardware configuration different from the first hardware configuration.

Example 20 includes the subject matter of Example 19, wherein the plurality of mapping groups are organized in a hierarchy based on computing capacity of a plurality of machines in each of the plurality of mapping groups.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method, comprising:
identifying, by one or more processors, a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users, wherein the plurality of mapping groups are organized in a hierarchy based on computing capacity of a plurality of machines in each of the plurality of mapping groups;
determining, by the one or more processors, a first metric indicating computing resource utilization of a first machine of the first plurality of machines when executing one or more sessions of a first user in the first mapping group, and a second metric indicating computing capacity of the second plurality of machines; and
re-mapping, by the one or more processors based at least in part on a first comparison of the first metric with a first threshold for the first mapping group and a second comparison of the second metric with a second threshold established for the second mapping group, the first user from the first mapping group to the second mapping group to cause sessions of the first user to execute on a second machine of the second plurality of machines with the second hardware configuration different from the first hardware configuration.

2. The method of claim 1, wherein the first threshold indicates a minimum computing resource utilization or a maximum computing resource utilization for the first plurality of machines, and wherein the second threshold indicates a minimum computing capacity or a maximum computing capacity of the second plurality of machines.

3. The method of claim 1, wherein the first metric indicates low computing resource utilization of the first machine, and the method further comprises:
re-mapping, by the one or more processors based at least in part on the first metric indicating the low computing resource utilization and the second metric, the first user from the first mapping group to the second mapping group.

4. The method of claim 1, comprising:
re-mapping, by the one or more processors based at least in part on the first metric indicating computing resource utilization higher than the first threshold of the first machine, the first user from the first mapping group to a third mapping group of the plurality of mapping groups, the third mapping group mapping a third plurality of users to a corresponding third plurality of machines having a third hardware configuration that hosts sessions for the third plurality of users, the third hardware configuration different from the first hardware configuration and the second hardware configuration.

5. The method of claim 1, wherein the computing capacity of the second plurality of machines is based on the second hardware configuration.

6. The method of claim 1, wherein the computing capacity of the second plurality of machines is based on computing resource utilization of the second plurality of machines.

7. The method of claim 1, comprising:
transferring, by the one or more processors, a profile of the first machine established for the first user to the second machine of the second plurality of machines to establish the second machine for the first user.

8. The method of claim 1, comprising:
determining, by the one or more processors, a third metric indicating computing resource utilization of the second machine established for a second user; and
swapping, by the one or more processors based on at least in part on the first metric for the first machine and the third metric for the second machine, a first profile of the first user from the first machine and a second profile of the second user from the second machine to cause the sessions of the first user to execute on the second machine and sessions of the second user to execute on the first machine.

9. A system, comprising:
one or more processors, coupled to memory, configured to:
identify a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users, wherein the plurality of mapping groups are organized in a hierarchy based on computing capacity of a plurality of machines in each of the plurality of mapping groups;
determine a first metric indicating computing resource utilization of a first machine of the first plurality of machines when executing one or more sessions of a first user in the first mapping group, and a second metric indicating computing capacity of the second plurality of machines; and
re-map, based at least in part on a first comparison of the first metric with a first threshold for the first mapping group and a second comparison of the second metric with a second threshold established for the second mapping group, the first user from the first mapping group to the second mapping group to cause sessions of the first user to execute on a second machine of the second plurality of machines with the second hardware configuration different from the first hardware configuration.

10. The system of claim 9, wherein the first threshold indicates a minimum computing resource utilization or a maximum computing resource utilization for the first plurality of machines, and wherein the second threshold indicates a minimum computing capacity or a maximum computing capacity of the second plurality of machines.

11. The system of claim 9, wherein the first metric indicates low computing resource utilization of the first machine, and the one or more processors are further configured to:

re-map, based at least in part on the first metric indicating the low computing resource utilization and the second metric, the first user from the first mapping group to the second mapping group.

12. The system of claim 9, wherein the one or more processors are further configured to:

re-map, based at least in part on the first metric indicating computing resource utilization higher than the first threshold of the first machine, the first user from the first mapping group to a third mapping group of the plurality of mapping groups, the third mapping group mapping a third plurality of users to a corresponding third plurality of machines having a third hardware configuration that hosts sessions for the third plurality of users, the third hardware configuration different from the first hardware configuration and the second hardware configuration.

13. The system of claim 9, wherein the computing capacity of the second plurality of machines is based on the second hardware configuration.

14. The system of claim 9, wherein the computing capacity of the second plurality of machines is based on computing resource utilization of the second plurality of machines.

15. A non-transitory computer readable storage medium storing instructions that, when executed by one or more processors, cause the one or more processors to:

identify a plurality of mapping groups comprising a first mapping group that maps a first plurality of users to a corresponding first plurality of machines having a first hardware configuration that hosts sessions for the first plurality of users, and a second mapping group that maps a second plurality of users to a corresponding second plurality of machines having a second hardware configuration that hosts sessions for the second plurality of users, wherein the plurality of mapping groups are organized in a hierarchy based on computing capacity of a plurality of machines in each of the plurality of mapping groups;

determine a first metric indicating computing resource utilization of a first machine of the first plurality of machines when executing one or more sessions of a first user in the first mapping group, and a second metric indicating computing capacity of the second plurality of machines; and re-map, based at least in part on a first comparison of the first metric with a first threshold for the first mapping group and a second comparison of the second metric with a second threshold established for the second mapping group, the first user from the first mapping group to the second mapping group to cause sessions of the first user to execute on a second machine of the second plurality of machines with the second hardware configuration different from the first hardware configuration.

* * * * *